United States Patent
Yang et al.

(10) Patent No.: US 9,877,311 B2
(45) Date of Patent: Jan. 23, 2018

(54) UPLINK CONTROL INFORMATION SENDING METHOD, AND USER EQUIPMENT AND BASE STATION

(71) Applicant: ZTE CORPORATION, Shenzhen, Guangdong Province (CN)

(72) Inventors: Weiwei Yang, Shenzhen (CN); Bo Dai, Shenzhen (CN); Chunli Liang, Shenzhen (CN); Shuqiang Xia, Shenzhen (CN); Huiying Fang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/909,418

(22) PCT Filed: May 22, 2014

(86) PCT No.: PCT/CN2014/078144
§ 371 (c)(1),
(2) Date: Feb. 1, 2016

(87) PCT Pub. No.: WO2014/173351
PCT Pub. Date: Oct. 30, 2014

(65) Prior Publication Data
US 2016/0174212 A1    Jun. 16, 2016

(30) Foreign Application Priority Data
Aug. 1, 2013  (CN) .......................... 2013 1 0332687

(51) Int. Cl.
*H04W 72/04*   (2009.01)
*H04L 5/00*   (2006.01)
(Continued)

(52) U.S. Cl.
CPC ....... *H04W 72/0413* (2013.01); *H04L 1/1671* (2013.01); *H04L 1/1854* (2013.01);
(Continued)

(58) Field of Classification Search
None
See application file for complete search history.

(56) References Cited

U.S. PATENT DOCUMENTS

| 8,780,937 B2 | 7/2014 | Classon et al. |
| 2007/0058595 A1* | 3/2007 | Classon ............... H04L 1/1812 370/337 |

(Continued)

FOREIGN PATENT DOCUMENTS

| CN | 101989898 A | 3/2011 |
| CN | 102651680 A | 8/2012 |

(Continued)

OTHER PUBLICATIONS

English description dated Aug. 16, 2012 of corresponding document WO2012108720A2.
(Continued)

*Primary Examiner* — Benjamin Lamont
(74) *Attorney, Agent, or Firm* — Plumsea Law Group, LLC

(57) ABSTRACT

There is provided a method for sending uplink control information, comprising when a Frequency Division Duplex (FDD) serving cell and a Time Division Duplex (TDD) serving cell are aggregated, a user equipment (UE) sending the uplink control information in uplink subframes of the FDD serving cell and/or uplink subframes of the TDD serving cell according to a predefined rule.

10 Claims, 9 Drawing Sheets

(51) Int. Cl.
  *H04L 1/16*    (2006.01)
  *H04L 1/18*    (2006.01)
  *H04L 5/14*    (2006.01)
(52) U.S. Cl.
  CPC ............ *H04L 1/1861* (2013.01); *H04L 5/001* (2013.01); *H04L 5/0001* (2013.01); *H04L 5/0053* (2013.01); *H04L 5/0055* (2013.01); *H04L 5/0057* (2013.01); *H04L 5/1469* (2013.01); *H04L 5/143* (2013.01)

(56) References Cited

U.S. PATENT DOCUMENTS

| | | | | |
|---|---|---|---|---|
| 2013/0028149 | A1* | 1/2013 | Chen | H04L 5/0005 370/280 |
| 2013/0322343 | A1* | 12/2013 | Seo | H04W 24/02 370/328 |
| 2013/0336267 | A1* | 12/2013 | Li | H04L 1/1854 370/329 |
| 2015/0173065 | A1* | 6/2015 | Fu | H04L 1/1861 370/280 |
| 2016/0013896 | A1* | 1/2016 | Sun | H04L 1/1854 370/280 |

FOREIGN PATENT DOCUMENTS

| | | |
|---|---|---|
| RU | 2007139903 A | 5/2009 |
| WO | 2012108720 A2 | 8/2012 |
| WO | 2012124980 A2 | 9/2012 |
| WO | 2014153751 A1 | 10/2014 |

OTHER PUBLICATIONS

European Search Report dated Jul. 11, 2016 in European Patent Application No. 14788348.2.
International Search Report and Written Opinion dated Sep. 4, 2014 in PCT/CN2014/078144.
Russian Office Action dated Jan. 9, 2017 for Russian Application No. 2016106199.
Office Action dated Jun. 15, 2017 for Australian Application No. 2014256609, 6pp.
3rd Generation Partnership Project; Technical Specification Group Radio Access Network; Evolved Universal Terrestrial Radio Access (E-UTRA); Physical layer procedures (Release 11), V11.3.0, published in Jun. 2013.

* cited by examiner

UPLINK CONTROL INFORMATION SENDING METHOD, AND USER EQUIPMENT AND BASE STATION

CROSS-REFERENCE TO RELATED APPLICATION(S)

This application is the U.S. National Phase application of PCT application number PCT/CN2014/078144 having a PCT filing date of May 22, 2014, which claims priority of Chinese patent application 201310332687.4 filed on Aug. 1, 2013, the disclosures of which are hereby incorporated by reference.

TECHNICAL FIELD

The present document relates to wireless communication technology, and more particularly, to a method for sending uplink control information, a user equipment and a base station.

BACKGROUND OF RELATED ART

Radio frames in Long Term Evolution (LTE) systems and LTE-Advanced (LTE-A) systems include frame structures in a Frequency Division Duplex (FDD) mode and a Time Division Duplex (TDD) mode. FIG. 1 is a schematic diagram of a frame structure in related LTE/LTE-A FDD systems. As shown in FIG. 1, a radio frame of 10 ms consists of twenty slots numbered 0-19, each having a length of 0.5 ms, slots 2i and 2i+1 forming a subframe i with a length of 1 ms. FIG. 2 is a schematic diagram of a frame structure in related LTE/LTE-A TDD systems. As shown in FIG. 2, a radio frame of 10 ms consists of two half frames each having a length of 5 ms, a half frame includes 5 subframes each having a length of 1 ms, and a subframe i is defined as 2 slots 2i and 2i+1 each having a length of 0.5 ms.

In the two frame structures described above, for normal cyclic prefix (CP), one slot contains seven symbols each having a length of 66.7 μm, wherein the CP length of the first symbol is 5.21 μs, and the length of each of the remaining 6 symbols is 4.69 μs; for extended cyclic prefix, one slot contains six symbols, the CP length of each of which is 16.67 μs. The supported uplink and downlink configuration is shown as in Table 1.

TABLE 1 uplink and downlink configuration table

| Uplink - downlink configuration | Downlink - uplink switching point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For each subframe in one radio frame, "D" represents a subframe dedicated to downlink transmission, "U" represents a subframe dedicated to uplink transmission, "S" represents a special subframe which contains three portions, Downlink Pilot Time Slot (DwPTS), Guard Period (GP) and Uplink Pilot Time Slot (UpPTS).

In an LTE system, an HARQ process refers to that when a sending end needs to transmit data, a receiving end allocates information required in transmission, such as frequency domain resources, packet information, etc., to the sending end through downlink signaling. The sending end sends data according to the information while storing the data into its own buffer for retransmission. The receiving end detects the data after receiving the data, and sends an acknowledgement (ACK) to the sending end if the data are received correctly. The sending end clears the buffer memory, which is used in this transmission, after receiving the ACK, and ends this transmission. If the data are not received correctly, then a non-acknowledgement (NACK) is sent to the sending end and packets which are not received correctly are stored into the buffer memory of the receiving end. After the sending end has received the NACK information, it extracts the data from its own buffer memory and retransmits the data in a specific packet format in corresponding subframes and corresponding frequent domain positions. The retransmitted packets, after being received by the receiving end, are combined with the packets which are not received correctly and are detected once more. The above process is repeated until the data are received correctly or a retransmission times exceeds the maximum transmission times threshold.

In an LTE/LTE-A system, there is following specification regarding to PDSCH scheduling in downlink HARQ, i.e., regarding to scheduling of downlink HARQ: UE detects the PDCCH on subframe n and resolves the PDSCH of the current subframe according to information of the PDCCH.

In an LTE/LTE-A FDD system, there is the following timing rule regarding to the PUCCH corresponding to the HARQ-ACK of the PDSCH sent in the downlink HARQ, i.e., the following specification regarding to a timing relationship of the downlink HARQ: UE detects PDSCH transmission on subframe n or indicates the PDCCH of the downlink SPS release and transmits the corresponding HARQ-ACK response on subframe n+4. In an LTE/LTE-A TDD system, there is the following specification regarding to a timing relationship of the downlink HARQ: UE detects PDSCH transmission on subframe n-k or indicates the PDCCH of the downlink SPS release and transmits the corresponding HARQ-ACK response on uplink subframe n, wherein k belongs to K, values of which are as shown in table 2.

TABLE 2 values of K in different uplink and downlink configurations

| Uplink - downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In an LTE system, for example a Frequency Division Duplex (FDD) system, because of a one-to-one correspondence between uplink and downlink subframes, the UE will feed back the ACK/NACK response information of 1 bit when the PDSCH contains only one transmission block, and the UE will feed back the ACK/NACK response information of 2 bits when the PDSCH contains two transmission blocks, and the UE will send the ACK/NACK response information of ½ bit using a PUCCH format 1a/1b. In a Time Division Duplex (FDD) system, because there is no one-to-one correspondence between uplink and downlink subframes, the ACK/NACK response information corresponding to a plurality of downlink subframes will be sent on the PUCCH of one uplink subframe, wherein a set of downlink subframes corresponding to the uplink subframe form a "bundling window". There are two methods for sending the ACK/NACK response information. One is bundling method, the key idea of which is to perform logical AND operation on the ACK/NACK response information, which is required to be fed back in the uplink subframe, of a transmission block corresponding to each of the downlink subframes. If there are 2 transmission blocks in one downlink subframe, UE will feed back the ACK/NACK response information of 2 bits, and if there is only one transmission block in each of the subframes, UE will feed back the ACK/NACK response information of 1 bit, and the UE will send the ACK/NACK response information of ½ bit using the PUCCH format 1a/1b. The other method is multiplexing with channel selection method, the key idea of which is to use different PUCCHs and different modulation symbols on the channels to represent different feedback states of the downlink subframe, which is required to be fed back in the uplink subframe. If there are a plurality of transmission blocks in the downlink subframes, logical AND operation (spatial bundling) will be performed on the ACK/NACK information fed back by the plurality of transmission blocks of the downlink subframes and then channels selection will be performed, and the UE will send the ACK/NACK response information using the format 1b with channel selection.

The most obvious advantage of the LTE-A system over the LTE system is that carrier aggregation is introduced in the LTE-A system, i.e., bandwidths of the LTE system are aggregated to obtain a greater bandwidth. In the system where the carrier aggregation is introduced, the aggregated carrier is called as a component carrier (CC), or is called as a serving cell. Meanwhile, concepts of Primary Component Carrier/Cell (PCC/PCell) and Secondary Component Carrier/Cell (SCC/SCell) are proposed. A primary serving cell and secondary serving cell are at least included in a system where the carrier aggregation is performed, wherein the primary serving cell is always in an activation state and the PUCCH is defined to be transmitted only on the Pcell.

In an LTE-A carrier aggregation system, when the HARQ-ACK response information is sent on the PUCCH, two sending methods are defined, PUCCH format 1b with channel selection and PUCCH format 3. For a UE which configures a plurality of serving cells, if the UE can support aggregation of only 2 serving cells at most, then the UE will send the HARQ-ACK using the PUCCH format 1b with channel selection when configuring the plurality of serving cells; if the UE can support aggregation of more than 2 serving cells, then when the UE configures the plurality of serving cells, a base station will further configure the UE through high layer signaling to determine whether the UE sends the HARQ-ACK response information using the PUCCH format 1b with channel selection or the PUCCH format 3.

The related carrier aggregation technology is applied to only FDD serving cells or TDD serving cells. In subsequent versions, considering the FDD serving cells and TDD serving cells, when the FDD serving cells and TDD serving cells are aggregated, how to send uplink control information is one of problems required to be solved urgently. Otherwise, the aggregation of the FDD serving cells and TDD serving cells cannot be achieved.

SUMMARY

The technical problem to be solved by the present document is to provide a method for sending uplink control information, a user equipment and a base station to solve the problem of sending the uplink control information when FDD serving cells and TDD serving cells are aggregated.

In order to solve the above technical problem, the present document provides a method for sending uplink control information, comprising:

when a Frequency Division Duplex (FDD) serving cell and a Time Division Duplex (TDD) serving cell are aggregated, a user equipment (UE) sending uplink control information in uplink subframes of the FDD serving cell and/or uplink subframes of the TDD serving cell according to a predefined rule;

wherein the predefined rule includes one or more of the following rules:

a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;

a primary serving cell is the TDD serving cell, subframes N have only the uplink subframes of the FDD serving cell, and when there is uplink control information to be sent in the subframes N, the UE sends the uplink control information in the uplink subframes of the FDD serving cell;

a primary serving cell is the TDD serving cell, subframes N have only the uplink subframes of the TDD serving cell, and when there is uplink control information to be sent in the subframes N, the UE sends the uplink control information in the uplink subframes of the TDD serving cell;

when a primary serving cell is the FDD serving cell, the UE sends the uplink control information in the uplink subframes of the FDD serving cell;

signaling indicates that the uplink control information is sent in the uplink subframes of the FDD serving cell or the uplink subframes of the TDD serving cell; and the uplink control information is transmitted in the uplink subframes of the primary serving cell.

Alternatively, in the method described above, the process in which a UE sending uplink control information in uplink subframes of the FDD serving cell and/or uplink subframes of the TDD serving cell according to a predefined rule is as follows:

the UE determines the uplink subframes in which the uplink control information is transmitted to be the uplink subframes of the FDD serving cell and/or the uplink subframes of the TDD serving cell according to the predefined rule, and transmits the uplink control information on Physical Uplink Control Channel (PUCCH) or Physical uplink Shared Channel (PUSCH) corresponding to the determined uplink subframes;

wherein the uplink control information includes one or more of channel state information (CSI), scheduling request (SR) and Hybrid automatic repeat request acknowledgement (HARQ-ACK).

Alternatively, in the method described above, when the UE sends the HARQ-ACK on the PUCCH or PUSCH corresponding to the determined uplink subframes, a process of sending the uplink control information is as follows:

the UE makes the FDD serving cell determine the HARQ-ACK which needs to be sent on the PUCCH or PUSCH corresponding to the determined uplink subframes according to a Physical downlink Shared Channel (PDSCH) and HARQ-ACK timing relationship corresponding to the FDD serving cell, and the UE makes the TDD serving cell determine the HARQ-ACK which needs to be sent on the PUCCH or PUSCH corresponding to the determined uplink subframes according to a PDSCH and HARQ timing relationship corresponding to the TDD serving cell; or the UE makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and the UE makes the TDD serving cell determine the HARQ-ACK which needs to be sent on the PUCCH or PUSCH corresponding to the determined uplink subframes according to the HARQ-ACK timing relationship corresponding to the FDD serving cell; or when the FDD serving cell is the primary serving cell, the UE makes both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell, and when the TDD serving cell is the primary serving cell, the UE makes the FDD serving cell and the TDD serving cell respectively determine the HARQ-ACK which needs to be sent on the PUCCH or PUSCH corresponding to the determined uplink subframes according to the PDSCH and HARQ-ACK timing relationships corresponding to the respective serving cells.

Alternatively, in the method described above, when the HARQ-ACK corresponds to the PDSCH of one serving cell, the UE sends the HARQ-ACK in the determined uplink subframes using a PUCCH format 1a/1b.

Alternatively, in the method described above, when the UE sends the HARQ-ACK on the PUCCH corresponding to the determined uplink subframes and a configured sending manner is PUCCH format 1b with channel selection, a mapping table used by the PUCCH format 1b with channel selection is selected according to any one of the following rules:

a mapping table corresponding to the TDD system is used;

a corresponding mapping table is selected according to M, when M>=2, a mapping table corresponding to the existing TDD system is used, and when M=1, a mapping table corresponding to the existing FDD system is used;

a corresponding mapping table is selected according to the value of M and the primary serving cell, when M>=2, the mapping table corresponding to the existing TDD system is used, and when M=1, in a case that the FDD serving cell is the primary cell, the mapping table corresponding to the existing FDD system is used, and in a case that the TDD serving cell is the primary cell, the mapping table corresponding to the existing TDD system is used.

Alternatively, in the method described above, the M is max{MTDD, MFDD}, MFDD is a number of downlink subframes within a binding window determined by the FDD serving cell according to the timing relationship, and when MFDD=1, MTDD is a number of downlink subframes within a binding window determined by the TDD serving cell according to the timing relationship; when the HARQ-ACK corresponds only the PDSCH of the FDD serving cell, MTDD=0.

Alternatively, in the method described above, when the UE sends the HARQ-ACK on the PUCCH corresponding to the determined uplink subframes and the configured sending manner is PUCCH format 3:

when the HARQ-ACK corresponds to the PDSCH of one serving cell, the UE sends the HARQ-ACK using the PUCCH format 1a/1b; and when the HARQ-ACK corresponds to the PDSCH of a plurality of serving cells, the UE sends the HARQ-ACK using the PUCCH format 3 of the existing TDD system.

Alternatively, in the method described above, when the HARQ-ACK corresponds to the PDSCH of one serving cell and the serving cell is not the primary serving cell, resources used when the UE sends with the PUCCH format 1a/1b are obtained by the following manners:

when the PDSCH of the serving cell corresponding to the HARQ-ADK is scheduled through cross-carrier by the primary serving cell, the PUCCH resources used when sending with the PUCCH format 1a/1b are obtained in an implicit mapping manner; and when the PDSCH of the serving cell corresponding to the HARQ-ADK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and transmission power control (TPC) corresponding to downlink control information (CCI) indicates the resources specifically used; or a set of resources is configured by a high layer, and acknowledgement/non-acknowledgement (ACK/NACK) resource offset (ARO) corresponding to Enhanced Physical Downlink Control Channel (E-PDCCH) indicates the resources specifically used.

The present document further discloses a user equipment, comprising:

a first unit, configured to determine uplink subframes in which uplink control information is transmitted to be uplink subframes of a Frequency Division Duplex (FDD) serving cell and/or uplink subframes of a Time Division Duplex (TDD) serving cell according to a predefined rule when the FDD serving cell and the TDD serving cell are aggregated; and a second unit, configured to send the uplink control information in the determined uplink subframes in which the uplink control information is transmitted;

wherein the predefined rule includes one or more of the following rules:

a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;

a primary serving cell is the TDD serving cell, subframes N have only the uplink subframes of the FDD serving cell, and when there is uplink control information to be sent in the subframes N, the UE sends the uplink control information in the uplink subframes of the FDD serving cell;

a primary serving cell is the TDD serving cell, subframes N have only the uplink subframes of the TDD serving cell, and when there is uplink control information to be sent in the subframes N, the UE sends the uplink control information in the uplink subframes of the TDD serving cell;

when a primary serving cell is the FDD serving cell, the UE sends the uplink control information in the uplink subframes of the FDD serving cell;

signaling indicates that the uplink control information is sent in the uplink subframes of the FDD serving cell or the uplink subframes of the TDD serving cell; and the uplink control information is transmitted in the uplink subframes of the primary serving cell.

Alternatively, in the user equipment described above, the second unit is configured to transmit the uplink control information on Physical Uplink Control Channel (PUCCH) or Physical uplink Shared Channel (PUSCH) corresponding to the determined uplink subframes in which the uplink control information is transmitted;

wherein the uplink control information includes one or more of channel state information (CSI), scheduling request (SR) and Hybrid automatic repeat request acknowledgement (HARQ-ACK).

Alternatively, in the user equipment described above, the second unit is configured to, when the uplink control information includes the HARQ-ACK, make the FDD serving cell determine the HARQ-ACK which needs to be sent on the PUCCH or PUSCH corresponding to the determined uplink subframes according to a Physical downlink Shared Channel (PDSCH) and HARQ-ACK timing relationship corresponding to the FDD serving cell, and make the TDD serving cell determine the HARQ-ACK which needs to be sent on the PUCCH or PUSCH corresponding to the determined uplink subframes according to a PDSCH and HARQ timing relationship corresponding to the TDD serving cell; or make the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and make the TDD serving cell determine the HARQ-ACK which needs to be sent on the PUCCH or PUSCH corresponding to the determined uplink subframes according to the HARQ-ACK timing relationship corresponding to the FDD serving cell; or make both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell when the FDD serving cell is the primary serving cell; and make the FDD serving cell and the TDD serving cell respectively determine the HARQ-ACK which needs to be sent on the PUCCH or PUSCH corresponding to the determined uplink subframes according to the PDSCH and HARQ-ACK timing relationship corresponding to the respective serving cell when the TDD serving cell is the primary serving cell.

Alternatively, in the user equipment described above, the second unit is configured to send the HARQ-ACK in the determined uplink subframes using a PUCCH format 1a/1b when the HARQ-ACK corresponds to the PDSCH of one serving cell.

Alternatively, in the user equipment described above, the second unit is configured to select a mapping table used by the PUCCH format 1b with channel selection according to any one of the following rules when the HARQ-ACK is sent on the PUCCH corresponding to the determined uplink subframes and a configured sending manner is PUCCH format 1b with channel selection:

a mapping table corresponding to the TDD system is used;

a corresponding mapping table is selected according to M, when M>=2, a mapping table corresponding to the existing TDD system is used, and when M=1, a mapping table corresponding to the existing FDD system is used; and a corresponding mapping table is selected according to the value of M and the primary serving cell, when M>=2, the mapping table corresponding to the existing TDD system is used, and when M=1, in a case that the FDD serving cell is the primary cell, the mapping table corresponding to the existing FDD system is used, and in a case that the TDD serving cell is the primary cell, the mapping table corresponding to the existing TDD system is used.

Alternatively, in the user equipment described above, the M is max{MTDD, MFDD}, MFDD is a number of downlink subframes within a binding window determined by the FDD serving cell according to the timing relationship, and when MFDD=1, MTDD is a number of downlink subframes within a binding window determined by the TDD serving cell according to the timing relationship; when the HARQ-ACK corresponds only the PDSCH of the FDD serving cell, MTDD=0.

Alternatively, in the user equipment described above, the second unit is configured to, when the HARQ-ACK is sent on the PUCCH corresponding to the determined uplink subframes and the configured sending manner is PUCCH format 3, send the HARQ-ACK using the PUCCH format 1a/1b when the HARQ-ACK corresponds to the PDSCH of one serving cell; and send the HARQ-ACK using the PUCCH format 3 of the existing TDD system when the HARQ-ACK corresponds to the PDSCH of a plurality of serving cells.

Alternatively, in the user equipment described above, the second unit is configured to, when the HARQ-ACK corresponds to the PDSCH of one serving cell and the serving cell is not the primary serving cell, obtain resources used when sending with the PUCCH format 1a/1b by the following manners:

when the PDSCH of the serving cell corresponding to the HARQ-ADK is scheduled through cross-carrier by the primary serving cell, the PUCCH resources used when sending with the PUCCH format 1a/1b are obtained in an implicit mapping manner; and when the PDSCH of the serving cell corresponding to the HARQ-ADK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and transmission power control (TPC) corresponding to downlink control information (CCI) indicates the resources specifically used; or a set of resources is configured by a high layer, and acknowledgement/non-acknowledgement (ACK/NACK) resource offset (ARO) corresponding to Enhanced Physical Downlink Control Channel (E-PDCCH) indicates the resources specifically used.

The present document further discloses a base station, comprising:

The present invention further discloses a base station, comprising:

a first unit, configured to determine uplink subframes in which uplink control information is transmitted to be uplink subframes of a Frequency Division Duplex (FDD) serving cell and/or uplink subframes of a Time Division Duplex (TDD) serving cell according to a predefined rule when the FDD serving cell and the TDD serving cell are aggregated; and a second unit, configured to receive the uplink control information in the determined uplink subframes in which uplink control information is transmitted;

wherein the predefined rule includes one or more of the following rules:

a primary serving cell is the TDD serving cell, subframes N have both the uplink subframes of the FDD serving cell and the uplink subframes of the TDD serving cell, and when there is uplink control information to be sent in the subframes N, the uplink control information is received in the uplink subframes of the TDD serving cell;

a primary serving cell is the TDD serving cell, subframes N have only the uplink subframes of the FDD serving cell, and when there is uplink control information to be sent in the subframes N, the uplink control information is received in the uplink subframes of the FDD serving cell;

a primary serving cell is the TDD serving cell, subframes N have only the uplink subframes of the TDD serving cell, and when there is uplink control information to be sent in the subframes N, the uplink control information is received in the uplink subframes of the TDD serving cell;

when a primary serving cell is the FDD serving cell, the uplink control information is received in the uplink subframes of the FDD serving cell;

signaling indicates that the uplink control information is transmitted in the uplink subframes of the FDD serving cell or the uplink subframes of the TDD serving cell; and the uplink control information is transmitted in the uplink subframes of the primary serving cell.

The technical scheme of the present application can solve the problem of sending the uplink control information when FDD serving cells and TDD serving cells are aggregated.

PREFERRED EMBODIMENTS OF THE INVENTION

Figure 1:
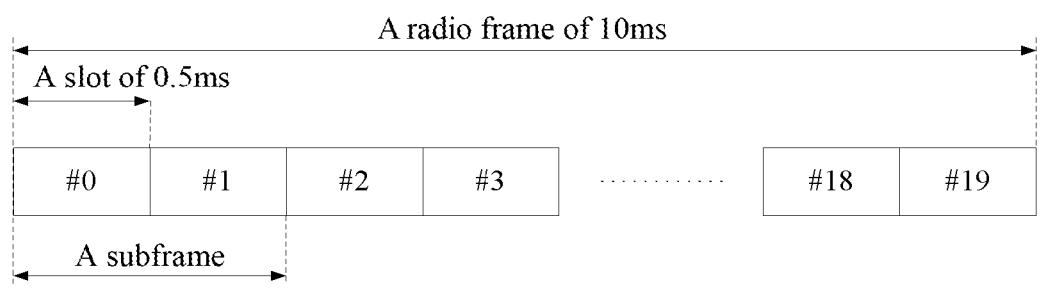
FIG. 1 is a schematic diagram of a frame structure in a FDD system in accordance with the related art.
Figure 2:
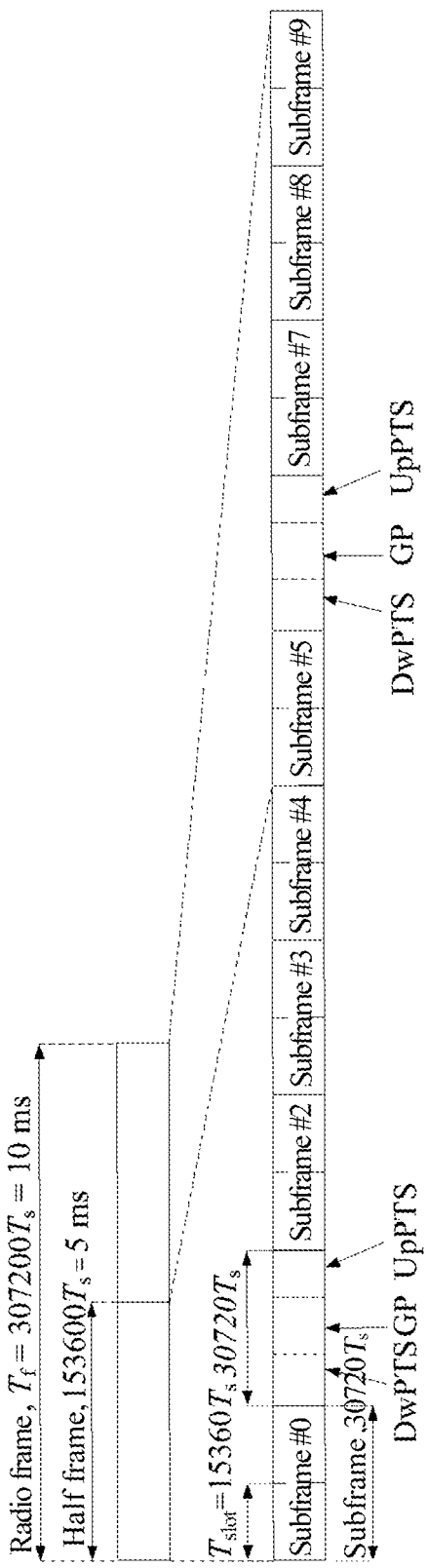
FIG. 2 is a schematic diagram of a frame structure in a TDD system in accordance with the related art.

The technical scheme of the present document will be described in further detail in conjunction with the accompanying drawings. It is should be noted that embodiments in the present application and various features in the embodiments can be combined with each other arbitrarily without conflict.

The First Embodiment

The present embodiment provides a method for sending uplink control information comprising:

when a Frequency Division Duplex (FDD) serving cell and a Time Division Duplex (TDD) serving cell are aggregated, a user equipment (UE) sending uplink control information in uplink subframes of the FDD serving cell and/or uplink subframes of the TDD serving cell according to a predefined rule;

wherein the predefined rule includes one or more of the following rules:

a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;

a primary serving cell is the TDD serving cell, subframes N have only the uplink subframes of the FDD serving cell, and when there is uplink control information to be sent in the subframes N, the UE sends the uplink control information in the uplink subframes of the FDD serving cell;

a primary serving cell is the TDD serving cell, subframes N have only the uplink subframes of the TDD serving cell, and when there is uplink control information to be sent in the subframes N, the UE sends the uplink control information in the uplink subframes of the TDD serving cell;

when a primary serving cell is the FDD serving cell, the UE sends the uplink control information in the uplink subframes of the FDD serving cell;

signaling indicates that the uplink control information is sent in the uplink subframes of the FDD serving cell or the uplink subframes of the TDD serving cell; and the uplink control information is transmitted in the uplink subframes of the primary serving cell.

In the method described above, various predefined rules may be chosen according to the type of the UE.

Preferably, when the UE has no ability of uplink carrier aggregation, the rule is that the uplink control information is transmitted in the uplink subframes of the primary serving cell. Or when the UE has the ability of uplink carrier aggregation, the rule is that signaling indicates that the uplink control information is sent in the uplink subframes of the FDD serving cell or the uplink subframes of the TDD serving cell.

In the method described above, the signaling configures various predefined rules.

Preferably, the used rules configured by the signaling are:
a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;

a primary serving cell is the TDD serving cell, subframes N have only the uplink subframes of the FDD serving cell, and when there is uplink control information to be sent in the subframes N, the UE sends the uplink control information in the uplink subframes of the FDD serving cell;

a primary serving cell is the TDD serving cell, subframes N have only the uplink subframes of the TDD serving cell, and when there is uplink control information to be sent in the subframes N, the UE sends the uplink control information in the uplink subframes of the TDD serving cell; and when a primary serving cell is the FDD serving cell, the UE sends the uplink control information in the uplink subframes of the FDD serving cell.

In the method described above, the process in which the UE sends the uplink control information in the uplink subframes of the FDD serving cell and/or the uplink subframes of the TDD serving cell according to the predefined rule may refer to the following operations:

the UE determines the uplink subframes in which the uplink control information is transmitted to be the uplink subframes of the FDD serving cell and/or the uplink subframes of the TDD serving cell according to the predefined rule, and transmits the uplink control information on the Physical Uplink Control Channel (PUCCH) or Physical uplink Shared Channel (PUSCH) corresponding to the determined uplink subframes;

wherein the uplink control information includes one or more of CSI, SR and HARQ-ACK.

When the UE sends the HARQ-ACK on the PUCCH or PUSCH corresponding to the determined uplink subframes, the process in which the uplink control information is sent is as follows:

the UE makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and the UE makes the TDD serving cell determine the HARQ-ACK which needs to be sent on the PUCCH or PUSCH corresponding to the determined uplink subframes according to the PDSCH and HARQ timing relationship corresponding to the TDD serving cell; or the UE makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and the UE makes the TDD serving cell determine the HARQ-ACK which needs to be sent on the PUCCH or PUSCH corresponding to the determined uplink subframes according to the HARQ-ACK timing relationship corresponding to the FDD serving cell; or when the FDD serving cell is the primary serving cell, the UE makes both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell, and when the TDD serving cell is the primary serving cell, the UE makes the FDD serving cell and the TDD serving cell respectively determine the HARQ-ACK which needs to be sent on the PUCCH or PUSCH corresponding to the determined uplink subframes according to the PDSCH and HARQ-ACK timing relationships corresponding to the respective serving cells.

Specifically, when the HARQ-ACK corresponds to the PDSCH of one serving cell, the UE sends the HARQ-ACK in the determined uplink subframes using a PUCCH format 1a/1b.

When the UE sends the HARQ-ACK on the PUCCH corresponding to the determined uplink subframes and a configured sending manner is PUCCH format 1b with channel selection, a mapping table used by the PUCCH format 1b with channel selection is selected according to any one of the following rules:

rule 1: a mapping table corresponding to the TDD system is used;

rule 2: the corresponding mapping table is selected according to M, when M>=2, a mapping table corresponding to the existing TDD system is used, and when M=1, a mapping table corresponding to the existing FDD system is used; and rule 3: the corresponding mapping table is selected according to the value of M and the primary serving cell, when M>=2, the mapping table corresponding to the existing TDD system is used, and when M=1, in the case that the FDD serving cell is the primary cell, the mapping table corresponding to the existing FDD system is used, and in the case that the TDD serving cell is the primary cell, the mapping table corresponding to the existing TDD system is used.

M is max{MTDD, MFDD}, MFDD is the number of downlink subframes within a binding window determined by the FDD serving cell according to the timing relationship, and when MFDD=1, MTDD is the number of downlink subframes within a binding window determined by the TDD serving cell according to the timing relationship; when the HARQ-ACK corresponds only the PDSCH of the FDD serving cell, MTDD=0.

When the UE sends the HARQ-ACK on the PUCCH corresponding to the determined uplink subframes and the configured sending manner is PUCCH format 3, the UE selects different sending manners according to different situations:

for example, when the HARQ-ACK corresponds to the PDSCH of one serving cell, the UE sends the HARQ-ACK using the PUCCH format 1a/1b; and when the HARQ-ACK corresponds to the PDSCH of a plurality of serving cells, the UE sends the HARQ-ACK using the PUCCH format 3 of the existing TDD system.

When the HARQ-ACK corresponds to the PDSCH of one serving cell and the serving cell is not the primary serving cell, resources used when the UE sends with the PUCCH format 1a/1b are obtained by the following manners:

when the PDSCH of the serving cell corresponding to the HARQ-ADK is scheduled through cross-carrier by the primary serving cell, the PUCCH resources used when sending with the PUCCH format 1a/1b are obtained in an implicit mapping manner; and when the PDSCH of the serving cell corresponding to the HARQ-ADK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and TPC corresponding to CCI indicates the resources specifically used; or a set of resources is configured by a high layer, and ARO corresponding to the E-PDCCH indicates the resources specifically used.

The present document will be further described in conjunction with specific application examples.

Example 1

The TDD serving cell is the primary serving cell, the TDD serving cell determines the HARQ-ACK which needs to be sent according to the PDSCH and HARQ timing relationship corresponding to the TDD serving cell, and the FDD serving cell determines the HARQ-ACK which needs to be sent according to the PDSCH and HARQ timing relationship corresponding to the FDD serving cell. When subframes N have both uplink subframes of the FDD serving cell and uplink subframes of the TDD serving cell, the PUCCH corresponding to the HARQ-ACK is sent in the uplink subframes where the TDD serving cell is located; and when the subframes N have only uplink subframes of the FDD serving cell, the PUCCH corresponding to the HARQ-ACK is sent in the uplink subframes where the FDD serving cell is located.

Figure 3A:
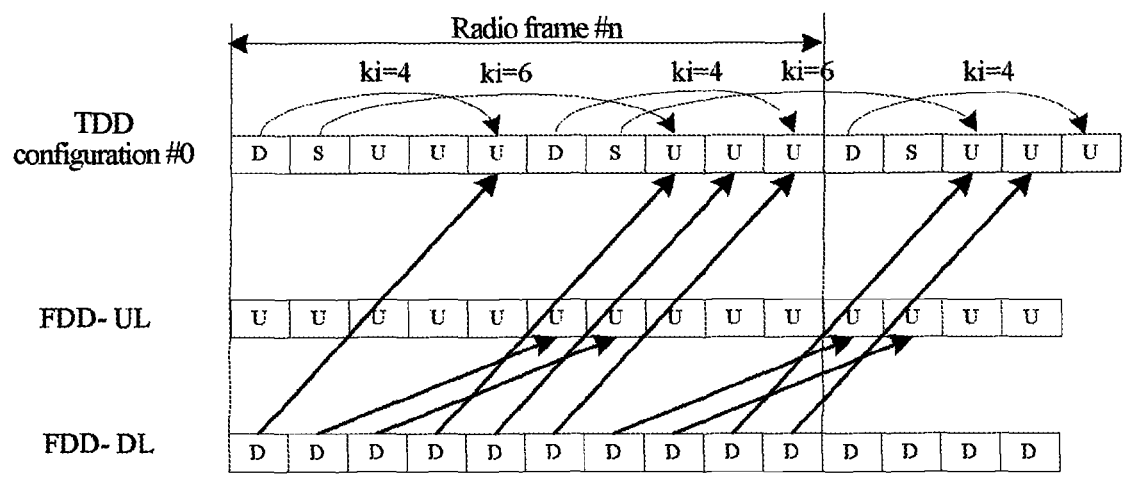
FIG. 3(a) is a schematic diagram of aggregation of a FDD serving cell and a TDD serving cell configuration 0 in accordance with the first example.

Assume that the FDD serving cell and TDD serving cell configuration 0 are aggregated, as shown in FIG. 3(a):

For the TDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {7} of the TDD serving cell in radio frame #n, downlink subframe {5} of radio frame #n is transmitted in uplink subframe {9} of the TDD serving cell in radio frame #n, and downlink subframe {6} of radio frame #n is transmitted in uplink subframe {2} of the TDD serving cell in radio frame #n+1.

For the FDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the TDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 4A:
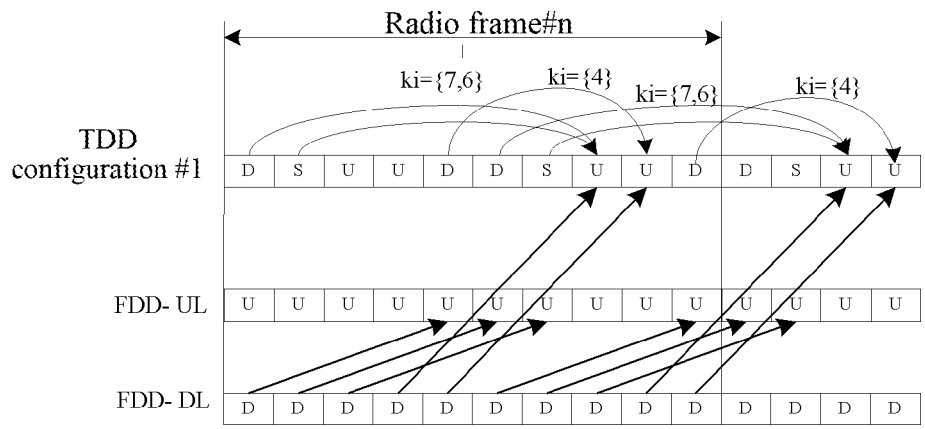
FIG. 4(a) is a schematic diagram of aggregation of a FDD serving cell and a TDD serving cell configuration 1 in accordance with the first example.

Assume that the FDD serving cell and TDD serving cell configuration 1 are aggregated, as shown in FIG. 4(a):

For the TDD serving cell, the HARQ corresponding to the PDSCH of downlink subframes {0, 1} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the TDD serving cell in radio frame #n, downlink subframes {5, 6} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the TDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame n+1, and downlink subframe {9} of radio frame #n is transmitted in uplink subframe {3} of the TDD serving cell in radio frame #n+1.

Figure 5A:
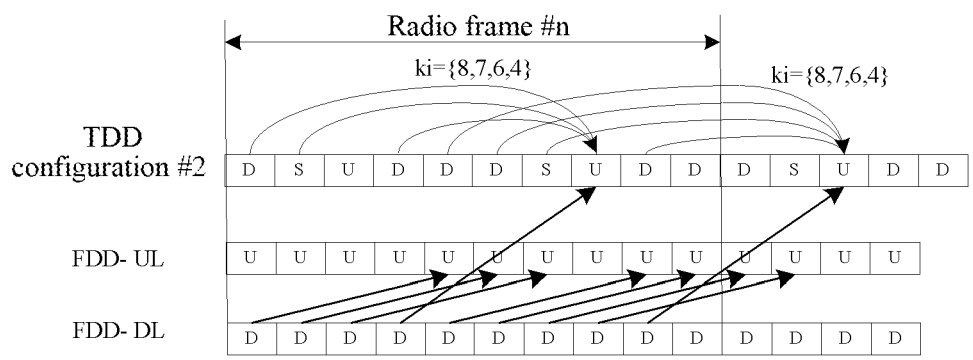
FIG. 5(a) is a schematic diagram of aggregation of a FDD serving cell and a TDD serving cell configuration 2 in accordance with the first example.

Assume that the FDD serving cell and TDD serving cell configuration 2 are aggregated, as shown in FIG. 5(a):

For the TDD serving cell, the HARQ corresponding to the PDSCH of downlink subframes {0, 1, 3} of radio frame #n is transmitted in uplink subframe {7} of the TDD serving cell in radio frame #n, and the HARQ corresponding to the PDSCH of downlink subframes {4, 5, 6, 8} of radio frame #n is transmitted in uplink subframe {2} of the TDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the FDD serving cell in radio frame #n+1.

Figure 6A:
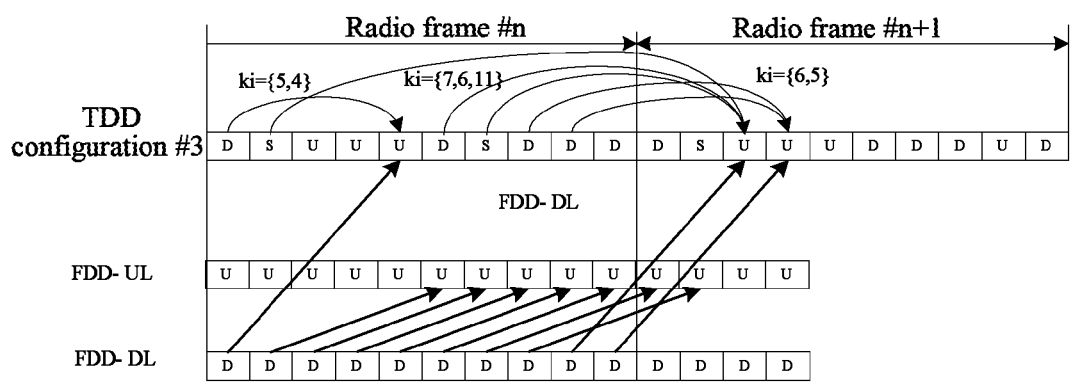
FIG. 6(a) is a schematic diagram of aggregation of a FDD serving cell and a TDD serving cell configuration 3 in accordance with the first example.

Assume that the FDD serving cell and TDD serving cell configuration 3 are aggregated, as shown in FIG. 6(a):

For the TDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframes {1, 5, 6} of radio frame #n is transmitted in uplink subframe {2} of the TDD serving cell in radio frame #n+1, and the HARQ corresponding to downlink subframes {7, 8} of radio frame #n is transmitted in uplink subframe {3} of the TDD serving cell in radio frame #n+1.

For the FDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 7A:
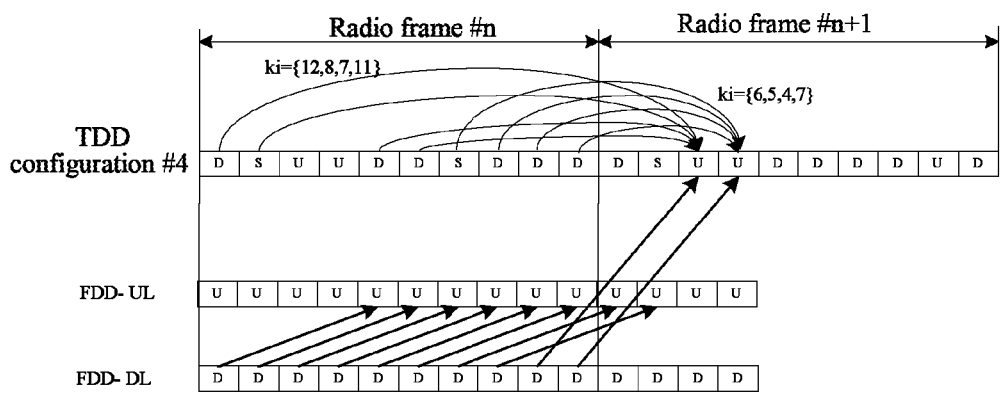
FIG. 7(a) is a schematic diagram of aggregation of a FDD serving cell and a TDD serving cell configuration 4 in accordance with the first example.

Assume that the FDD serving cell and TDD serving cell configuration 4 are aggregated, as shown in FIG. 7(a):

For the TDD serving cell, the HARQ corresponding to the PDSCH of downlink subframes {0, 1, 4, 5} of radio frame #n is transmitted in uplink subframe {2} of the TDD serving cell in radio frame #n+1, and the HARQ corresponding to the PDSCH of downlink subframes {6, 7, 8, 9} of radio frame #n is transmitted in uplink subframe {3} of the TDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 8A:
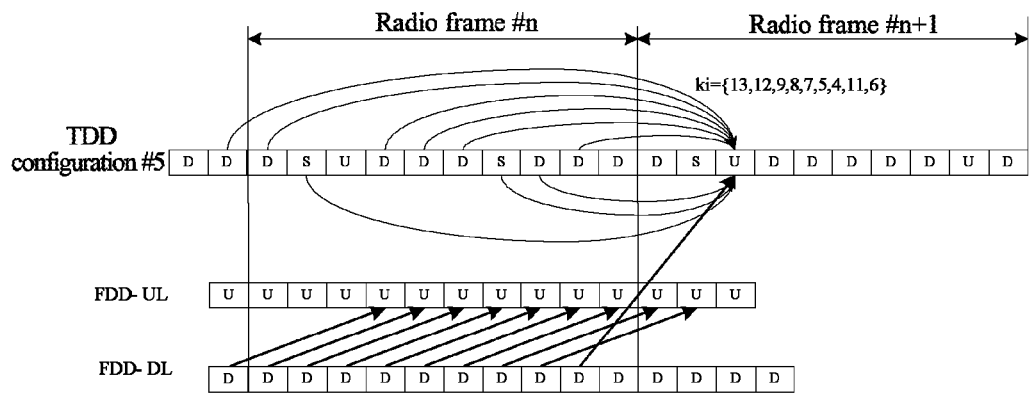
FIG. 8(a) is a schematic diagram of aggregation of a FDD serving cell and a TDD serving cell configuration 5 in accordance with the first example.

Assume that the FDD serving cell and TDD serving cell configuration 5 are aggregated, as shown in FIG. 8(a):

For the TDD serving cell, the HARQ corresponding to the PDSCH of downlink subframe {9} of radio frame #n−1 and downlink subframes {0, 1, 3, 4, 5, 6, 7, 8} of radio frame #n is transmitted in uplink subframe {2} of the TDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the FDD serving cell in radio frame #n+1.

Figure 9A:
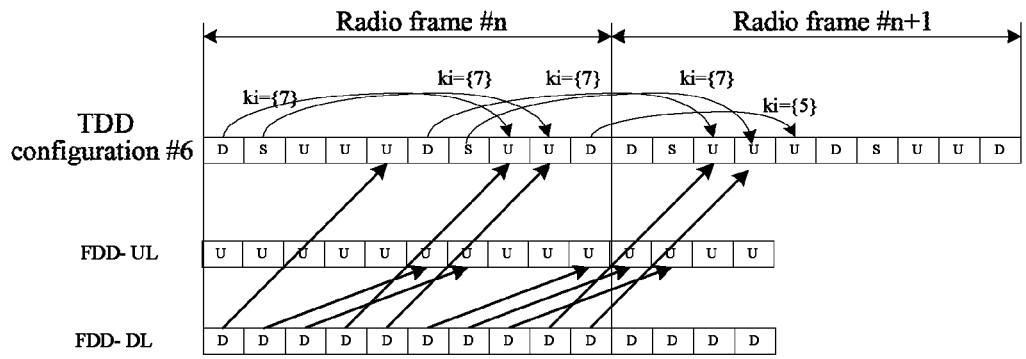
FIG. 9(a) is a schematic diagram of aggregation of a FDD serving cell and a TDD serving cell configuration 6 in accordance with the first example.

Assume that the FDD serving cell and TDD serving cell configuration 6 are aggregated, as shown in FIG. 9(a):

For the TDD serving cell, the HARQ corresponding to the PDSCH of downlink subframe {0} of radio frame #n is transmitted in uplink subframe {7} of the TDD serving cell in radio frame #n, the HARQ corresponding to the PDSCH of downlink subframe {1} of radio frame #n is transmitted in uplink subframe {8} of the TDD serving cell in radio frame #n, the HARQ corresponding to the PDSCH of downlink subframe {5} of radio frame #n is transmitted in uplink subframe {2} of the TDD serving cell in radio frame #n+1, the HARQ corresponding to the PDSCH of downlink subframe {6} of radio frame #n is transmitted in uplink subframe {3} of the TDD serving cell in radio frame #n+1, and the HARQ corresponding to the PDSCH of downlink subframe {9} of radio frame #n is transmitted in uplink subframe {4} of the TDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the TDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Example 2

The TDD serving cell is the primary serving cell, the TDD serving cell determines the HARQ-ACK which needs to be sent according to the PDSCH and HARQ timing relationship corresponding to the FDD serving cell, and the FDD serving cell determines the HARQ-ACK which needs to be sent according to the PDSCH and HARQ timing relationship corresponding to the FDD serving cell. When subframes N have both uplink subframes of the FDD serving cell and uplink subframes of the TDD serving cell, the PUCCH corresponding to the HARQ-ACK is sent in the uplink subframes where the TDD serving cell is located; and when the subframes N have only uplink subframes of the FDD serving cell, the PUCCH corresponding to the HARQ-ACK is sent in the uplink subframes where the FDD serving cell is located.

Figure 3B:
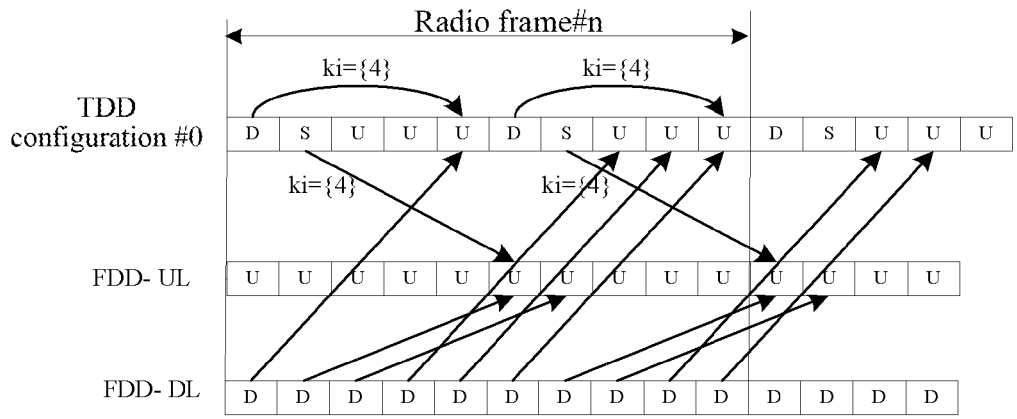
FIG. 3(b) is a schematic diagram of aggregation of a FDD serving cell and a TDD serving cell configuration 0 in accordance with the second example.

Assume that the FDD serving cell and TDD serving cell configuration 0 are aggregated, as shown in FIG. 3(b):

For the TDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {5} of radio frame #n is transmitted in uplink subframe {9} of the TDD serving cell in radio frame #n, and downlink subframe {6} of radio frame #n is transmitted in uplink subframe {0} of the FDD serving cell in radio frame #n.

For the FDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the TDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 4B:
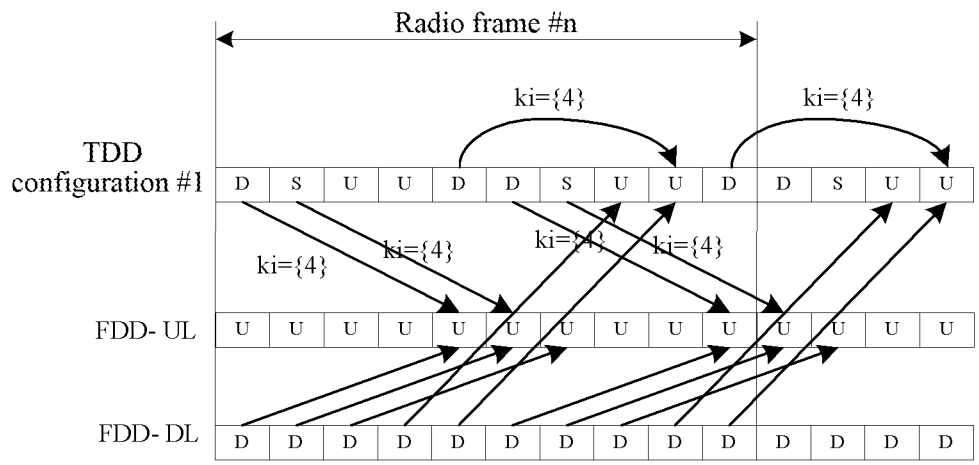
FIG. 4(b) is a schematic diagram of aggregation of a FDD serving cell and a TDD serving cell configuration 1 in accordance with the second example.

Assume that the FDD serving cell and TDD serving cell configuration 1 are aggregated, as shown in FIG. 4(b):

For the TDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {4} of radio frame #n is transmitted in uplink subframe {8} of the TDD serving cell in radio frame #n, the HARQ corresponding to the PDSCH of downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame n+1, and downlink subframe {9} of radio frame #n is transmitted in uplink subframe {3} of the TDD serving cell in radio frame #n+1.

For the FDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the TDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 5B:
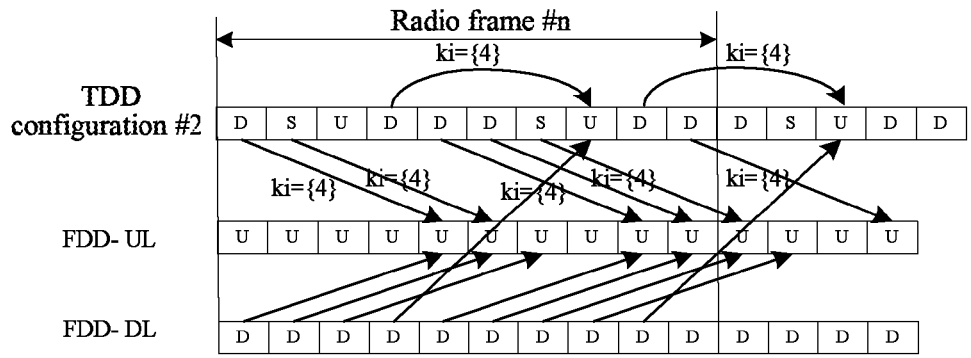
FIG. 5(b) is a schematic diagram of aggregation of a FDD serving cell and a TDD serving cell configuration 2 in accordance with the second example.

Assume that the FDD serving cell and TDD serving cell configuration 2 are aggregated, as shown in FIG. 5(b):

For the TDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the FDD serving cell in radio frame #n, the HARQ corresponding to the PDSCH of downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {8} of radio frame #n is transmitted in uplink subframe {2} of the TDD serving cell in radio frame #n, and the HARQ corresponding to the PDSCH of downlink subframe {9} of radio frame #n is transmitted in uplink subframe {3} of the FDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the FDD serving cell in radio frame #n+1.

Figure 6B:
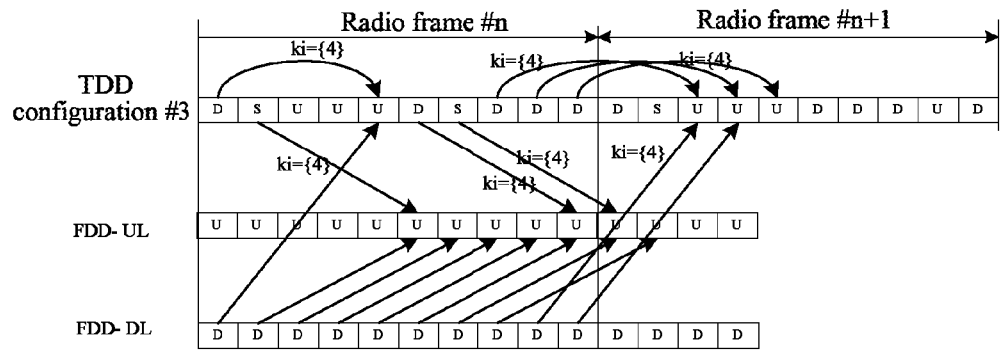
FIG. 6(b) is a schematic diagram of aggregation of a FDD serving cell and a TDD serving cell configuration 3 in accordance with the second example.

Assume that the FDD serving cell and TDD serving cell configuration 3 are aggregated, as shown in FIG. 6(b):

For the TDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, the HARQ corresponding to the PDSCH of downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the TDD serving cell in radio frame #n+1, the HARQ corresponding to the PDSCH of downlink subframe {8} of radio frame #n is transmitted in uplink subframe {2} of the TDD serving cell in radio frame #n+1, and the HARQ corresponding to the PDSCH of downlink subframe {9} of radio frame #n is transmitted in uplink subframe {3} of the FDD serving cell in radio frame #n+1.

For the FDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 7B:
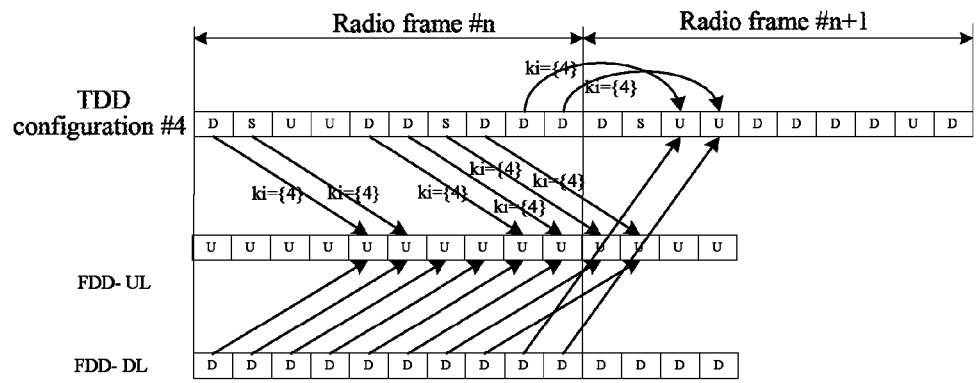
FIG. 7(b) is a schematic diagram of aggregation of a FDD serving cell and a TDD serving cell configuration 4 in accordance with the second example.

Assume that the FDD serving cell and TDD serving cell configuration 4 are aggregated, as shown in FIG. 7(b):

For the TDD serving cell, the HARQ corresponding to the PDSCH of downlink subframe {0} of radio frame #n is transmitted in uplink subframe {4} of the FDD serving cell in radio frame #n, for the TDD serving cell, the HARQ corresponding to the PDSCH of downlink subframe {1} of radio frame #n is transmitted in uplink subframe {5} of the FDD serving cell in radio frame #n, for the TDD serving cell, the HARQ corresponding to the PDSCH of downlink subframe {4} of radio frame #n is transmitted in uplink subframe {8} of the FDD serving cell in radio frame #n, for the TDD serving cell, the HARQ corresponding to the PDSCH of downlink subframe {5} of radio frame #n is transmitted in uplink subframe {9} of the FDD serving cell in radio frame #n, for the TDD serving cell, the HARQ corresponding to the PDSCH of downlink subframe {6} of radio frame #n is transmitted in uplink subframe {0} of the FDD serving cell in radio frame #n+1, for the TDD serving cell, the HARQ corresponding to the PDSCH of downlink subframe {7} of radio frame #n is transmitted in uplink subframe {1} of the FDD serving cell in radio frame #n+1, for the TDD serving cell, the HARQ corresponding to the PDSCH of downlink subframe {8} of radio frame #n is transmitted in uplink subframe {2} of the TDD serving cell in radio frame #n+1, for the TDD serving cell, the HARQ corresponding to the PDSCH of downlink subframe {9} of radio frame #n is transmitted in uplink subframe {3} of the TDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Figure 8B:
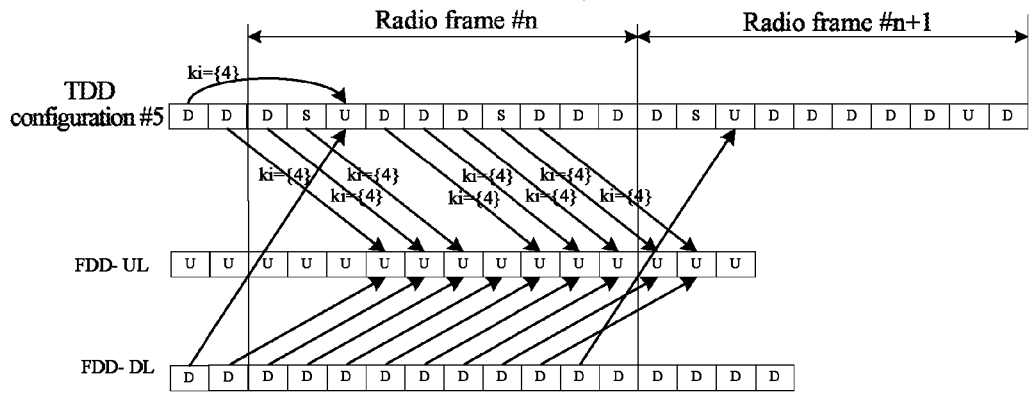
FIG. 8(b) is a schematic diagram of aggregation of a FDD serving cell and a TDD serving cell configuration 5 in accordance with the second example.

Assume that the FDD serving cell and TDD serving cell configuration 5 are aggregated, as shown in FIG. 8(b):

For the TDD serving cell, the HARQ corresponding to the PDSCH of downlink subframe {8} of radio frame #n is transmitted in uplink subframe {2} of the TDD serving cell in radio frame #n, the HARQ corresponding to the PDSCH of downlink subframe {9} of radio frame #n−1 is transmitted in uplink subframe {3} of the FDD serving cell in radio frame #n, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, the HARQ corresponding to the PDSCH of downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, and the HARQ corresponding to the PDSCH of downlink subframe {7} of radio frame #n is transmitted in uplink subframe {1} of the FDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the FDD serving cell in radio frame #n+1.

Figure 9B:
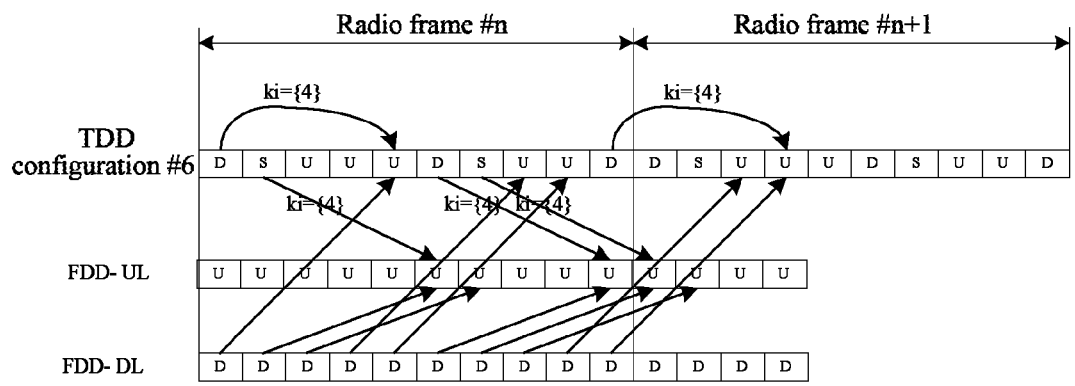
FIG. 9(b) is a schematic diagram of aggregation of a FDD serving cell and a TDD serving cell configuration 6 in accordance with the second example.

Assume that the FDD serving cell and TDD serving cell configuration 6 are aggregated, as shown in FIG. 9(b):

For the TDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, the HARQ corresponding to the PDSCH of downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, and the HARQ corresponding to the PDSCH of downlink subframe {9} of radio frame #n is transmitted in uplink subframe {4} of the TDD serving cell in radio frame #n+1.

For the FDD serving cell, the HARQ corresponding to the PDSCH of downlink subframe {0} of radio frame #n is transmitted in uplink subframe {4} of the TDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the TDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the TDD serving cell in radio frame #n+1, and downlink subframe {9} of radio frame #n is transmitted in uplink subframe {3} of the TDD serving cell in radio frame #n+1.

Example 3

The FDD serving cell is the primary serving cell, the TDD serving cell determines the HARQ-ACK which needs to be sent according to the PDSCH and HARQ timing relationship corresponding to the TDD serving cell, and the FDD serving cell determines the HARQ-ACK which needs to be sent according to the PDSCH and HARQ timing relationship corresponding to the FDD serving cell, and the PUCCH corresponding to the HARQ-ACK is sent in the uplink subframes where the FDD serving cell is located.

Figure 3C:
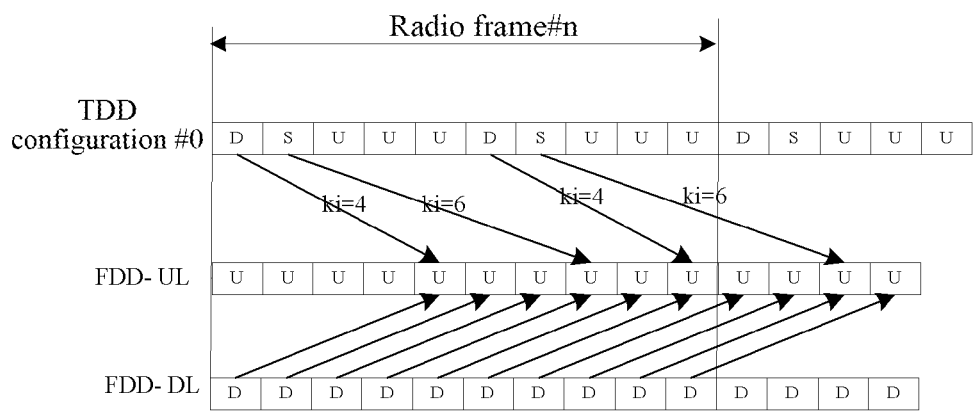
FIG. 3(c) is a schematic diagram of aggregation of a FDD serving cell and a TDD serving cell configuration 0 in accordance with the third example.

Assume that the FDD serving cell and TDD serving cell configuration 0 are aggregated, as shown in FIG. 3(c):

For the TDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {7} of the FDD serving cell in radio frame #n, downlink subframe {5} of radio frame #n is transmitted in uplink subframe {9} of the FDD serving cell in radio frame #n, and downlink subframe {6} of radio frame #n is transmitted in uplink subframe {2} of the FDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the TDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the FDD serving cell in radio frame #n+1, and downlink subframe {9} of radio frame #n is transmitted in uplink subframe {3} of the TDD serving cell in radio frame #n.

Figure 4C:
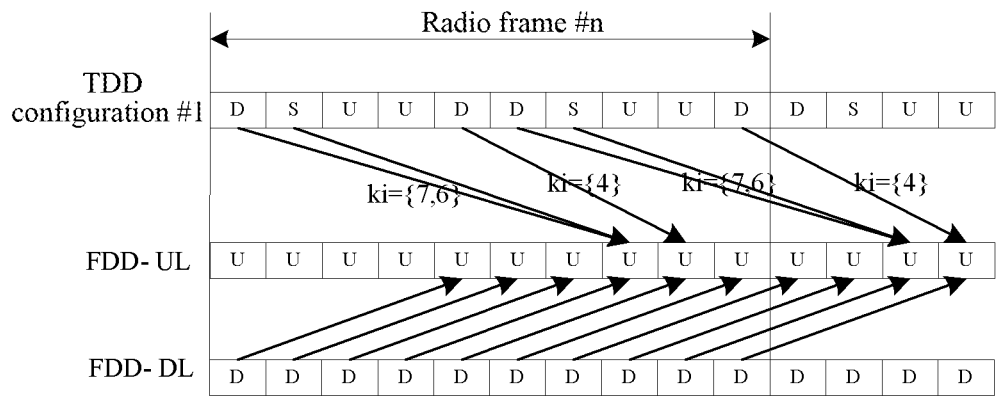
FIG. 4(c) is a schematic diagram of aggregation of a FDD serving cell and a TDD serving cell configuration 1 in accordance with the third example.

Assume that the FDD serving cell and TDD serving cell configuration 1 are aggregated, as shown in FIG. 4(c):

For the TDD serving cell, the HARQ corresponding to the PDSCH of downlink subframes {0, 1} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframes {5, 6} of radio frame #n is transmitted in uplink subframe {2} of the FDD serving cell in radio frame #n+1, and downlink subframe {9} of radio frame #n is transmitted in uplink subframe {3} of the FDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the FDD serving cell in radio frame #n+1, and downlink subframe {9} of radio frame #n is transmitted in uplink subframe {3} of the FDD serving cell in radio frame #n+1.

Example 4

The FDD serving cell is the primary serving cell, the TDD serving cell determines the HARQ-ACK which needs to be sent according to the PDSCH and HARQ timing relationship corresponding to the FDD serving cell, and the FDD serving cell determines the HARQ-ACK which needs to be sent according to the PDSCH and HARQ timing relationship corresponding to the FDD serving cell, and the PUCCH corresponding to the HARQ-ACK is sent in the uplink subframes where the FDD serving cell is located.

Figure 5C:
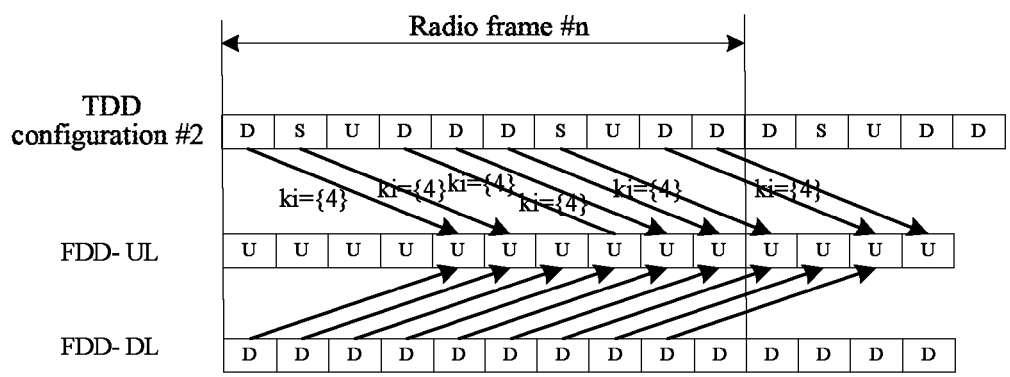
FIG. 5(c) is a schematic diagram of aggregation of a FDD serving cell and a TDD serving cell configuration 2 in accordance with the fourth example.

Assume that the FDD serving cell and TDD serving cell configuration 2 are aggregated, as shown in FIG. 5(c):

For the TDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, the HARQ corresponding to the PDSCH of downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {8} of radio frame #n is transmitted in uplink subframe {2} of the FDD serving cell in radio frame #n, and the HARQ corresponding to the PDSCH of downlink subframe {9} of radio frame #n is transmitted in uplink subframe {3} of the FDD serving cell in radio frame #n+1.

For the FDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {2} of radio frame #n is transmitted in uplink subframe {6} of the FDD serving cell in radio frame #n, the HARQ corresponding to the PDSCH of downlink subframe {3} of radio frame #n is transmitted in uplink subframe {7} of the FDD serving cell in radio frame #n, the HARQ corresponding to the PDSCH of downlink subframe {4} of radio frame #n is transmitted in uplink subframe {8} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, downlink subframe {8} of radio frame #n is transmitted in uplink subframe {2} of the FDD serving cell in radio frame #n+1, and downlink subframe {9} of radio frame #n is transmitted in uplink subframe {3} of the FDD serving cell in radio frame #n+1.

Figure 6C:
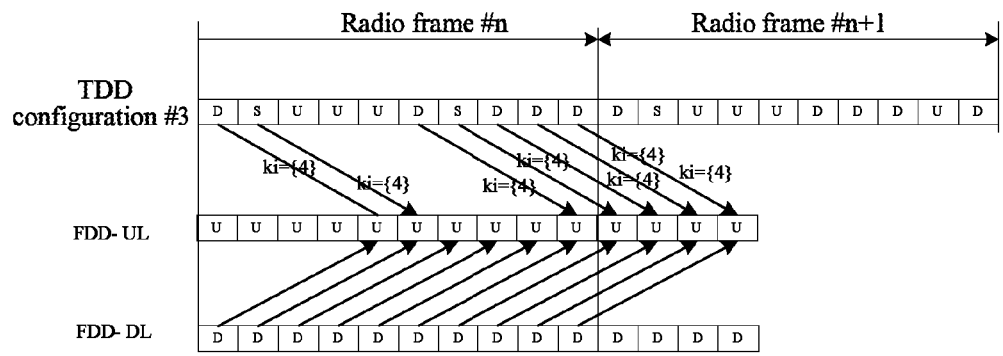
FIG. 6(c) is a schematic diagram of aggregation of a FDD serving cell and a TDD serving cell configuration 3 in accordance with the fourth example.

Assume that the FDD serving cell and TDD serving cell configuration 3 are aggregated, as shown in FIG. 6(c):

For the TDD serving cell, the HARQ corresponding to the PDSCH of downlink subframe {0} of radio frame #n is transmitted in uplink subframe {4} of the FDD serving cell in radio frame #n, the HARQ corresponding to the PDSCH of downlink subframe {1} of radio frame #n is transmitted in uplink subframe {5} of the FDD serving cell in radio frame #n, downlink subframe {5} of radio frame #n is transmitted in uplink subframe {9} of the FDD serving cell in radio frame #n, the HARQ corresponding to the PDSCH of downlink subframe {6} of radio frame #n is transmitted in uplink subframe {0} of the FDD serving cell in radio frame #n+1, the HARQ corresponding to the PDSCH of downlink subframe {7} of radio frame #n is transmitted in uplink subframe {1} of the FDD serving cell in radio frame #n+1, the HARQ corresponding to the PDSCH of downlink subframe {8} of radio frame #n is transmitted in uplink subframe {2} of the FDD serving cell in radio frame #n+1, and the HARQ corresponding to the PDSCH of downlink subframe {9} of radio frame #n is transmitted in uplink subframe {3} of the FDD serving cell in radio frame #n+1.

Example 5

The FDD serving cell is the primary serving cell, the FDD serving cell schedules the TDD serving cell by cross-carrier, the TDD serving cell determines the HARQ-ACK which needs to be sent according to the PDSCH and HARQ timing relationship corresponding to the FDD serving cell, and the FDD serving cell determines the HARQ-ACK which needs to be sent according to the PDSCH and HARQ timing relationship corresponding to the FDD serving cell, and the PUCCH corresponding to the HARQ-ACK is sent in the uplink subframes where the FDD serving cell is located.

Example 6

The FDD serving cell and TDD serving cell configuration 0 are aggregated. Assume that SR is required to be sent in subframe #2 and CSI is required to be sent in subframe #5.

Assume that the TDD serving cell is the primary serving cell, then SR is sent on the PUCCH corresponding to uplink subframe #2 of the TDD serving cell and CSI is sent on the PUCCH or PISCH corresponding to uplink subframe #5 of the FDD serving cell.

Assume that the FDD serving cell is the primary serving cell, then SR is sent on the PUCCH corresponding to uplink subframe #2 of the FDD serving cell and CSI is sent on the PUCCH or PISCH corresponding to uplink subframe #5 of the FDD serving cell.

Assume that signaling configures SR to be sent in uplink subframes of the FDD serving cell and CSI also to be sent in the FDD serving cell, then the SR is sent on the PUCCH corresponding to uplink subframe #2 of the FDD serving cell and the CSI is sent on the PUCCH or PISCH corresponding to uplink subframe #5 of the FDD serving cell.

Example 7

As shown in FIG. 4(a), the TDD serving cell is the primary serving cell, according to the PDSCH and HARQ- ACK timing relationship determined in specific example 2 in the first embodiment and the uplink subframes sent on the PUCCH corresponding to the HARQ-ACK, when the sending manner is configured as format 1b with channel selection, when a mapping table is selected according to rule 1, i.e., the mapping table corresponding to the TDD system is used, in the existing TDD system, mapping tables in which the number of downlink subframes in a binding window is less than or equal to 2 are shown as table 3. table 4, table 5, a mapping table in which the number of downlink subframes in a binding window is 3 is shown as table 6, and a mapping table in which the number of downlink subframes in a binding window is 4 is shown as table 7.

TABLE 3 a mapping table in which A = 2

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 4 a mapping table in which A = 3

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |

TABLE 4-continued a mapping table in which A = 3

| HARQ-ACK(0), HARQ-ACK(1), HARQ-ACK(2) | $n_{PUCCH}^{(1)}$ | b(0)b(1) |
|---|---|---|
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 5 a mapping table in which A = 4

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

TABLE 6 a mapping table in which the number of downlink subframes in a binding window is 3

| Primary serving cell HARQ-ACK(0), HARQ-ACK(1), HARQ-ACK(2) | Secondary serving cell HARQ-ACK(0), HARQ-ACK(1), HARQ-ACK(2) | resources $n_{PUCCH}^{(1)}$ | Constellation point b(0), b(1) | Encoding incoming bit o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |

TABLE 6-continued a mapping table in which the number of downlink subframes in a binding window is 3

| Primary serving cell HARQ-ACK(0), HARQ-ACK(1), HARQ-ACK(2) | Secondary serving cell HARQ-ACK(0), HARQ-ACK(1), HARQ-ACK(2) | resources $n_{PUCCH}^{(1)}$ | Constellation point b(0), b(1) | Encoding incoming bit o(0), o(1), o(2), o(3) |
|---|---|---|---|---|
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No transmission | | 0, 0, 0, 0 |

TABLE 7 a mapping table in which the number of downlink subframes in a binding window is 4

| Primary serving cell HARQ-ACK(0), HARQ-ACK(1), HARQ-ACK(2), HARQ-ACK(3) | Secondary serving cell HARQ-ACK(0), HARQ-ACK(1), HARQ-ACK(2), HARQ-ACK(3) | resources $n_{PUCCH}^{(1)}$ | Constellation point b(0), b(1) | Encoding incoming bit o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |

TABLE 7-continued a mapping table in which the number of downlink subframes in a binding window is 4

| Primary serving cell HARQ-ACK(0), HARQ-ACK(1), HARQ-ACK(2), HARQ-ACK(3) | Secondary serving cell HARQ-ACK(0), HARQ-ACK(1), HARQ-ACK(2), HARQ-ACK(3) | resources $n_{PUCCH}^{(1)}$ | Constellation point b(0), b(1) | Encoding incoming bit o(0), o(1), o(2), o(3) |
|---|---|---|---|---|
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No transmission | | 0, 0, 0, 0 |
| DTX, any, any, any | (ACK, NACK/DTX, any, any), except for (ACK, DTX, DTX, DTX) | No transmission | | 0, 0, 0, 0 |

For uplink subframe #4, the FDD serving cell determines the number MFDD=1 of downlink subframes in a binding window according to the timing relationship described above. Because only the HARQ-ACK of the FDD serving cell needs to be sent on the PUCCH of subframe #4, i.e., the HARQ-ACK corresponds to only the PDSCH of the FDD serving cell, MTDD=0, at that point, M=1.

When the PDSCH of downlink subframe #0 of the FDD serving cell corresponds to 1 transmission block, the format 1b with channel selection is implemented according to the table in which A=2, and the correspondence relationship of HARQ(1) is as shown in FIG. 8.

TABLE 8 a correspondence relationship table of HARQ(j) when A = 2

| A = 2 | HARQ (0) | HARQ (1) |
|---|---|---|
| | DTX | HARQ-ACK corresponding to PDSCH on FDD downlink subframe #0 |

When the PDSCH of downlink subframe #0 of the FDD serving cell corresponds to 2 transmission blocks, the format 1b with channel selection is implemented according to the table in which A=3, and the correspondence relationship of HARQ(j) is as shown in FIG. 9.

TABLE 9 a correspondence relationship table of HARQ(j) when A = 3

| A = 3 | HARQ (0) | HARQ (1) | HARQ (2) |
|---|---|---|---|
| | DTX | HARQ-ACK corresponding to PDSCH transmission block #0 on FDD downlink subframe #0 | HARQ-ACK corresponding to PDSCH transmission block #1 on FDD downlink subframe #0 |

For uplink subframes #5, #6 and #9, the implementation way of the PUCCH format 1b with channel selection is similar to that for uplink subframe #4 and will not be repeated herein.

For uplink subframe #7, the FDD serving cell determines the number MFDD=1 of downlink subframes in a binding window according to the timing relationship described above, and the TDD serving cell determines the number MTDD=2 of downlink subframes in a binding window according to the timing relationship described above, i.e., M=2.

MFDD=1 of downlink subframes in a binding window according to the timing relationship described above, i.e., M=1.

According to the number of transmission blocks corresponding to the PDSCH of downlink subframe #4 of the FDD serving cell and downlink subframe #4 of the TDD serving cell, the tables in which A=2, A=3 and A=4 are selected to implement the format 1b with channel selection, the correspondence relationship of HARQ(j) is shown in table 11, table 12 and table 13 respectively.

TABLE 11 a correspondence relationship table of HARQ(j) when A = 2

| A = 2 | HARQ (0) | HARQ (1) |
|---|---|---|
| | HARQ-ACK corresponding to PDSCH on TDD downlink subframe #4 | HARQ-ACK corresponding to PDSCH on FDD downlink subframe #4 |

TABLE 12 a correspondence relationship table of HARQ(j) when A = 3

| A = 3 | HARQ (0) | HARQ (1) | HARQ (2) |
|---|---|---|---|
| | HARQ-ACK corresponding to PDSCH transmission blocks #0 on TDD downlink subframe #4 | HARQ-ACK corresponding to PDSCH transmission blocks #1 on TDD downlink subframe #4 | HARQ-ACK corresponding to PDSCH on FDD downlink subframe #4 |

TABLE 13 a correspondence relationship table of HARQ(j) when A = 4

| A = 4 | HARQ (0) | HARQ (1) | HARQ (2) | HARQ (3) |
|---|---|---|---|---|
| | HARQ-ACK corresponding to PDSCH transmission blocks #0 on TDD downlink subframe #4 | HARQ-ACK corresponding to PDSCH transmission blocks #1 on TDD downlink subframe #4 | HARQ-ACK corresponding to PDSCH transmission blocks #0 on FDD downlink subframe #4 | HARQ-ACK corresponding to PDSCH transmission blocks #1 on FDD downlink subframe #4 |

Figure 10:
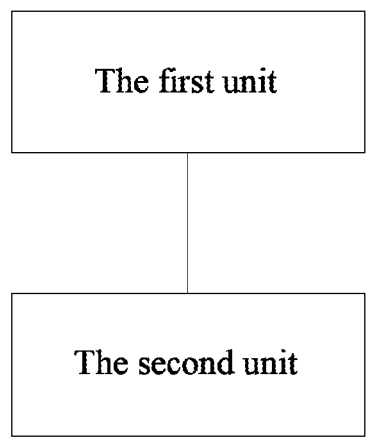
FIG. 10 is a block diagram of a user equipment.

The PUCCH format 1b with channel selection is implemented according to the table in which A=3, and the correspondence relationship of HARQ(j) is as shown in FIG. 10.

TABLE 10 a correspondence relationship table of HARQ(j) when A = 3

| A = 3 | HARQ (0) | HARQ (1) | HARQ (2) |
|---|---|---|---|
| | HARQ-ACK corresponding to PDSCH on TDD downlink subframe #0 | HARQ-ACK corresponding to PDSCH on TDD downlink subframe #1 | HARQ-ACK corresponding to PDSCH on TDD downlink subframe #4 |

For uplink subframe #8, the FDD serving cell determines the number MFDD=1 of downlink subframes in a binding window according to the timing relationship described above, and the FDD serving cell determines the number The mapping table is selected according to rule 2, i.e., when M>=2, the mapping table corresponding to the existing TDD system is used, and when M=1, the mapping table corresponding to the existing FDD system is used. The mapping tables corresponding to the existing TDD system are shown as table 3, table 4 and table 5; the mapping tables corresponding to the existing FDD system are shown as table 14, table 15 and table 16.

TABLE 14 a mapping table in which A = 2

| HARQ-ACK(0) | HARQ-ACK(1) | $n_{PUCCH}^{(1)}$ | b(0)b(1) |
|---|---|---|---|
| ACK | ACK | $n_{PUCCH, 1}^{(1)}$ | 1, 1 |
| ACK | NACK/DTX | $n_{PUCCH, 0}^{(1)}$ | 1, 1 |
| NACK/DTX | ACK | $n_{PUCCH, 1}^{(1)}$ | 0, 0 |
| NACK | NACK/DTX | $n_{PUCCH, 0}^{(1)}$ | 0, 0 |
| DTX | NACK/DTX | No Transmission | |

TABLE 15 a mapping table in which A = 3

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | |

TABLE 16 a mapping table in which A = 4

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | |

Their implementation ways are the same as in the specific example 1 and will not be repeated herein.

The mapping table is selected according to rule 3, i.e., when M>=2, the mapping table corresponding to the existing TDD system is used, and when M=1, since the primary cell is the TDD serving cell, the mapping table corresponding to the existing FDD system is used. The mapping tables corresponding to the existing TDD system are shown as table 1, table 2, table 3, table 4 and table 5; the mapping tables corresponding to the existing FDD system are shown as table 14, table 15 and table 16. The implementation way is the same as that in the specific example 1 and will not be repeated herein.

Example 8

As shown in FIG. 7(a), the TDD serving cell is the primary serving cell, according to the PDSCH and HARQ-ACK timing relationship and the uplink subframes sent on the PUCCH corresponding to the HARQ-ACK determined in specific example 5 in the first embodiment, when the sending manner is configured as the format 1b with channel selection, a mapping table is selected according to rule 1, i.e., the mapping table corresponding to the TDD system is used.

For uplink subframes #4, #5, #6, #7, #8 and #9 of radio frame #n and uplink subframes #0 and #1 of radio frame #n+1, the implementation way is the same as that in the specific example 5 in the first embodiment and will not be repeated herein.

For uplink subframe #2 of radio frame #n+1, the FDD serving cell determines the number MFDD=1 of downlink subframes in a binding window according to the timing relationship described above and the TDD serving cell determines the number MTDD=4 of downlink subframes in a binding window according to the timing relationship described above, i.e., M=4. The format 1b with channel selection is implemented according to table 7, and the correspondence relationship of HARQ(j) is as shown in table 17.

TABLE 17 a correspondence relationship table of HARQ(j)

| Primary serving cell | HARQ-ACK (0) | HARQ-ACK corresponding to PDSCH on the subframe in which DL DAI = 0 is located in downlink subframes {#0, #1, #4, #5} of TDD radio frame #n |
| | HARQ-ACK (1) | HARQ-ACK corresponding to PDSCH on the subframe in which DL DAI = 1 is located in downlink subframes {#0, #1, #4, #5} of TDD radio frame #n |

TABLE 17-continued a correspondence relationship table of HARQ(j)

|  | HARQ-ACK (2) | HARQ-ACK corresponding to PDSCH on the subframe in which DL DAI = 2 is located in downlink subframes {#0, #1, #4, #5} of TDD radio frame #n |
|---|---|---|
|  | HARQ-ACK (3) | HARQ-ACK corresponding to PDSCH on the subframe in which DL DAI = 3 is located in downlink subframes {#0, #1, #4, #5} of TDD radio frame #n |
| Secondary serving cell | HARQ-ACK (0) | HARQ-ACK corresponding to PDSCH on downlink subframe #8 of FDD radio frame #n |
|  | HARQ-ACK (1) | DTX/NACK |
|  | HARQ-ACK (2) | DTX/NACK |
|  | HARQ-ACK (3) | DTX/NACK |

Example 9

As shown in FIG. 7(a), the TDD serving cell is the primary serving cell, according to the PDSCH and HARQ-ACK timing relationship and the uplink subframes sent on the PUCCH corresponding to the HARQ-ACK determined in the specific example 5 in the first embodiment, when the sending manner is PUCCH format 3, For uplink subframe #4 of radio frame #0, the HARQ-ACK corresponds to the PDSCH of only one serving cell, and is sent using the PUCCH format 1a/1b, If downlink subframe #0 in the FDD serving cell in radio frame #0 is scheduled through cross-carrier by the TDD serving cell, then the resources corresponding to the format 1a/1b are obtained in an implicit mapping manner, otherwise, they are obtained by configuring through a high layer, or a set of resources is configured by a high layer, and TPC corresponding to CCI indicates the resources specifically used, or a set of resources is configured by a high layer, and ARO corresponding to the E-PDCCH indicates the resources specifically used;

the processing manner for uplink subframes #5, #6, #7, and #9 of radio frame #n and uplink subframes #0 and #1 of radio frame #n+1 is the same as that for uplink subframe #4 of radio frame #n and will not be repeated herein;

For uplink subframes #2 and #3 of radio frame #n+1, the HARQ-ACK corresponds to the PDSCH of a plurality of serving cells, and the PUCCH format 3 of the existing TDD system, which belongs to the prior art and will not be repeated herein, is used.

The Second Embodiment

The second embodiment provides a user equipment which, as shown in FIG. 10, can implement transmission of uplink control information in the first embodiment described above and include at least two units, a first unit and a second unit.

The first unit determines uplink subframes in which uplink control information is transmitted to be uplink subframes of the FDD serving cell and/or uplink subframes of the TDD serving cell according to a predefined rule when the FDD serving cell and the TDD serving cell are aggregated.

The second unit sends the uplink control information in the determined uplink subframes in which the uplink control information is transmitted.

The predefined rule includes one or more of the following rules:

a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;

a primary serving cell is the TDD serving cell, subframes N have only the uplink subframes of the FDD serving cell, and when there is uplink control information to be sent in the subframes N, the UE sends the uplink control information in the uplink subframes of the FDD serving cell;

a primary serving cell is the TDD serving cell, subframes N have only the uplink subframes of the TDD serving cell, and when there is uplink control information to be sent in the subframes N, the UE sends the uplink control information in the uplink subframes of the TDD serving cell;

when a primary serving cell is the FDD serving cell, the UE sends the uplink control information in the uplink subframes of the FDD serving cell;

signaling indicates that the uplink control information is sent in the uplink subframes of the FDD serving cell or the uplink subframes of the TDD serving cell; and the uplink control information is transmitted in the uplink subframes of the primary serving cell.

Specifically, the second unit transmits the uplink control information on the PUCCH or PUSCH corresponding to the determined uplink subframes in which the uplink control information is transmitted.

The uplink control information includes one or more of CSI, SR and HARQ-ACK.

When the uplink control information includes the HARQ-ACK, the second unit makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and makes the TDD serving cell determine the HARQ-ACK which needs to be sent on the PUCCH or PUSCH corresponding to the determined uplink subframes according to the PDSCH and HARQ timing relationship corresponding to the TDD serving cell; or the second unit makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and makes the TDD serving cell determine the HARQ-ACK which needs to be sent on the PUCCH or PUSCH corresponding to the determined uplink subframes according to the HARQ-ACK timing relationship corresponding to the FDD serving cell; or the second unit makes both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell when the FDD serving cell is the primary serving cell, and makes the FDD serving cell and the TDD serving cell respectively determine the HARQ-ACK which needs to be sent on the PUCCH or PUSCH corresponding to the determined uplink subframes according to the PDSCH and HARQ-ACK timing relationship corresponding to the respective serving cell when the TDD serving cell is the primary serving cell.

In practical application, the second unit can send the HARQ-ACK in the determined uplink subframes using a PUCCH format 1a/1b when the HARQ-ACK corresponds to the PDSCH of one serving cell.

Specifically, the second unit selects a mapping table used by the PUCCH format 1b with channel selection according to any one of the following rules when the HARQ-ACK is sent on the PUCCH corresponding to the determined uplink subframes and a configured sending manner is PUCCH format 1b with channel selection:

a mapping table corresponding to a TDD system is used;

a corresponding mapping table is selected according to M, when M>=2, a mapping table corresponding to the existing TDD system is used, and when M=1, a mapping table corresponding to the existing FDD system is used; and a corresponding mapping table is selected according to the value of M and the primary serving cell, when M>=2, a mapping table corresponding to the existing TDD system is used, and when M=1, in the case that the FDD serving cell is the primary cell, a mapping table corresponding to the existing FDD system is used, and in the case that the TDD serving cell is the primary cell, a mapping table corresponding to the existing TDD system is used.

Specifically, M is max{MTDD, MFDD}, MFDD is the number of downlink subframes within a binding window determined by the FDD serving cell according to the timing relationship, and when MFDD=1, MTDD is the number of downlink subframes within a binding window determined by the TDD serving cell according to the timing relationship; when the HARQ-ACK corresponds only the PDSCH of the FDD serving cell, MTDD=0.

In addition, when the HARQ-ACK is sent on the PUCCH corresponding to the determined uplink subframes and the configured sending manner is PUCCH format 3, the second unit selects different sending manners according to different cases.

For example, the second unit sends the HARQ-ACK using the PUCCH format 1a/1b when the HARQ-ACK corresponds to the PDSCH of one serving cell.

The second unit sends the HARQ-ACK using the PUCCH format 3 of the existing TDD system when the HARQ-ACK corresponds to the PDSCH of a plurality of serving cells.

When the HARQ-ACK corresponds to the PDSCH of one serving cell and the serving cell is not the primary serving cell, the second unit obtains resources used when sending with the PUCCH format 1a/1b by the following manners:

when the PDSCH of the serving cell corresponding to the HARQ-ADK is scheduled through cross-carrier by the primary serving cell, the PUCCH resources used when sending with the PUCCH format 1a/1b are obtained in an implicit mapping manner; and when the PDSCH of the serving cell corresponding to the HARQ-ADK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and TPC corresponding to CCI indicates the resources specifically used; or a set of resources is configured by a high layer, and ARO corresponding to the E-PDCCH indicates the resources specifically used.

The Third Embodiment

The present embodiment provides a base station comprising two units, a first unit and a second unit.

The first unit determines uplink subframes in which uplink control information is transmitted to be uplink subframes of the FDD serving cell and/or uplink subframes of the TDD serving cell according to a predefined rule when the FDD serving cell and the TDD serving cell are aggregated.

The second unit receives the uplink control information in the determined uplink subframes in which uplink control information is transmitted.

The predefined rule includes one or more of the following rules:

a primary serving cell is the TDD serving cell, subframes N have both the uplink subframes of the FDD serving cell and the uplink subframes of the TDD serving cell, and when there is uplink control information to be sent in the subframes N, the uplink control information is received in the uplink subframes of the TDD serving cell;

a primary serving cell is the TDD serving cell, subframes N have only the uplink subframes of the FDD serving cell, and when there is uplink control information to be sent in the subframes N, the uplink control information is received in the uplink subframes of the FDD serving cell;

a primary serving cell is the TDD serving cell, subframes N have only the uplink subframes of the TDD serving cell, and when there is uplink control information to be sent in the subframes N, the uplink control information is received in the uplink subframes of the TDD serving cell;

when a primary serving cell is the FDD serving cell, the uplink control information is received in the uplink subframes of the FDD serving cell;

signaling indicates that the uplink control information is transmitted in the uplink subframes of the FDD serving cell or the uplink subframes of the TDD serving cell; and the uplink control information is transmitted in the uplink subframes of the primary serving cell.

Specifically, the second unit receives the uplink control information on the PUCCH or PUSCH corresponding to the determined uplink subframes in which the uplink control information is transmitted.

The uplink control information includes one or more of CSI, SR and HARQ-ACK.

When the uplink control information includes the HARQ-ACK, the second unit makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and makes the TDD serving cell determine the HARQ-ACK which needs to be sent on the PUCCH or PUSCH corresponding to the determined uplink subframes according to the PDSCH and HARQ timing relationship corresponding to the TDD serving cell; or the second unit makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and makes the TDD serving cell determine the HARQ-ACK which needs to be sent on the PUCCH or PUSCH corresponding to the determined uplink subframes according to the HARQ-ACK timing relationship corresponding to the FDD serving cell; or the second unit makes both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell when the FDD serving cell is the primary serving cell, and makes the FDD serving cell and the TDD serving cell respectively determine the HARQ-ACK which needs to be sent on the PUCCH or PUSCH corresponding to the determined uplink subframes according to the PDSCH and HARQ-ACK timing relationship corresponding to the respective serving cell when the TDD serving cell is the primary serving cell.

The second unit receives the HARQ-ACK in the determined uplink subframes using a PUCCH format 1a/1b when the HARQ-ACK corresponds to the PDSCH of one serving cell.

The second unit selects a mapping table used by the PUCCH format 1b with channel selection according to any one of the following rules when the HARQ-ACK is received on the PUCCH corresponding to the determined uplink subframes and the configured transmitting manner is PUCCH format 1b with channel selection:

a mapping table corresponding to a TDD system is used;

a corresponding mapping table is selected according to M, when M>=2, a mapping table corresponding to the existing TDD system is used, and when M=1, a mapping table corresponding to the existing FDD system is used; and a corresponding mapping table is selected according to the value of M and the primary serving cell, when M>=2, a mapping table corresponding to the existing TDD system is used, and when M=1, in the case that the FDD serving cell is the primary cell, a mapping table corresponding to the existing FDD system is used, and in the case that the TDD serving cell is the primary cell, a mapping table corresponding to the existing TDD system is used.

Specifically, M is max{MTDD, MFDD}, MFDD is the number of downlink subframes within a binding window determined by the FDD serving cell according to the timing relationship, and when MFDD=1, MTDD is the number of downlink subframes within a binding window determined by the TDD serving cell according to the timing relationship; when the HARQ-ACK corresponds only the PDSCH of the FDD serving cell, MTDD=0.

When the HARQ-ACK is received on the PUCCH corresponding to the determined uplink subframes and the configured transmitting manner is PUCCH format 3:

the second unit receives the HARQ-ACK using the PUCCH format 1a/1b when the HARQ-ACK corresponds to the PDSCH of one serving cell; and the second unit receives the HARQ-ACK using the PUCCH format 3 of the existing TDD system when the HARQ-ACK corresponds to the PDSCH of a plurality of serving cells.

When the HARQ-ACK corresponds to the PDSCH of one serving cell and the serving cell is not the primary serving cell, the second unit obtains resources used when receiving with the PUCCH format 1a/1b by the following manners:

when the PDSCH of the serving cell corresponding to the HARQ-ADK is scheduled through cross-carrier by the primary serving cell, the PUCCH resources used when receiving with the PUCCH format 1a/1b are obtained in an implicit mapping manner; and when the PDSCH of the serving cell corresponding to the HARQ-ADK is not scheduled through cross-carrier by the primary serving cell, the PUCCH resources used when receiving with the PUCCH format 1a/1b are obtained in any one of the following manners:

configuring through high layer signaling; or a set of resources is configured by a high layer, and TPC corresponding to CCI indicates the resources specifically used; or a set of resources is configured by a high layer, and ARO corresponding to the E-PDCCH indicates the resources specifically used.

People having ordinary skill in the art may understand that all or part of steps in the method described above can be carried out by programs instructing the related hardware, the programs can be stored in computer readable storage medium, such as read-only memory, magnetic disk or optical disk. Optionally, all or part of steps in the embodiments described above can be carried out using one or more integrated circuits. Accordingly, each module/unit in the embodiments described above can be implemented in a form of hardware, or can be implemented using a form of software functional module. The present application is not limited to the combination of any specific form of hardware and software.

All above is to describe the preferred embodiments of the present document only and is not used to limit the protect scope of the present document. Any modification, equivalent substitution and improvement made within the spirit and principle of the present document should be included in the protection scope of the present document.

INDUSTRIAL APPLICABILITY

The technical scheme of the present application can solve the problem of sending uplink control information when FDD serving cells and TDD serving cells are aggregated.

What we claim is:

1. A method for sending uplink control information, comprising:
    when a Frequency Division Duplex (FDD) serving cell and a Time Division Duplex (TDD) serving cell are aggregated, a user equipment (UE) sending uplink control information in uplink subframes of the FDD serving cell and/or uplink subframes of the TDD serving cell according to a predefined rule;
    wherein the predefined rule includes one or more of the following rules:
        a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;
        a primary serving cell is the TDD serving cell, subframes N have only the uplink subframes of the FDD serving cell, and when there is uplink control information to be sent in the subframes N, the UE sends the uplink control information in the uplink subframes of the FDD serving cell;
        when a primary serving cell is the FDD serving cell, the UE sends the uplink control information in the uplink subframes of the FDD serving cell;
        signaling indicates that the uplink control information is sent in the uplink subframes of the FDD serving cell or the uplink subframes of the TDD serving cell; and
        the uplink control information is transmitted in the uplink subframes of the primary serving cell;
    wherein the process of a UE sending uplink control information in uplink subframes of the FDD serving cell and/or uplink subframes of the TDD serving cell according to a predefined rule is as follows:
        the UE determines the uplink subframes in which the uplink control information is transmitted to be the uplink subframes of the FDD serving cell and/or the uplink subframes of the TDD serving cell according to the predefined rule, and transmits the uplink control information on Physical Uplink Control Channel (PUCCH) or Physical uplink Shared Channel (PUSCH) corresponding to the determined uplink subframes;

wherein the uplink control information includes one or more of channel state information (CSI), scheduling request (SR) and Hybrid automatic repeat request acknowledgement (HARQ-ACK); wherein, when the UE sends the HARQ-ACK on the PUCCH or PUSCH corresponding to the determined uplink subframes, a process of sending the uplink control information is as follows:

the UE makes the FDD serving cell determine the HARQ-ACK which needs to be sent on the PUCCH or PUSCH corresponding to the determined uplink subframes according to a Physical downlink Shared Channel (PDSCH) and HARQ-ACK timing relationship corresponding to the FDD serving cell, and the UE makes the TDD serving cell determine the HARQ-ACK which needs to be sent on the PUCCH or PUSCH corresponding to the determined uplink subframes according to a PDSCH and HARQ timing relationship corresponding to the TDD serving cell; or the UE makes the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and the UE makes the TDD serving cell determine the HARQ-ACK which needs to be sent on the PUCCH or PUSCH corresponding to the determined uplink subframes according to the HARQ-ACK timing relationship corresponding to the FDD serving cell; or when the FDD serving cell is the primary serving cell, the UE makes both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell, and when the TDD serving cell is the primary serving cell, the UE makes the FDD serving cell and the TDD serving cell respectively determine the HARQ-ACK which needs to be sent on the PUCCH or PUSCH corresponding to the determined uplink subframes according to the PDSCH and HARQ-ACK timing relationships corresponding to the respective serving cells;

wherein, when the UE sends the HARQ-ACK on the PUCCH corresponding to the determined uplink subframes and a configured sending manner is PUCCH format 1b with channel selection, a mapping table used by the PUCCH format 1b with channel selection is selected according to any one of the following rules:

a mapping table corresponding to the TDD system is used;

a corresponding mapping table is selected according to M, when M>=2, a mapping table corresponding to the existing TDD system is used, and when M=1, a mapping table corresponding to the existing FDD system is used; and a corresponding mapping table is selected according to the value of M and the primary serving cell, when M>=2, the mapping table corresponding to the existing TDD system is used, and when M=1, in a case that the FDD serving cell is the primary cell, the mapping table corresponding to the existing FDD system is used, and in a case that the TDD serving cell is the primary cell, the mapping table corresponding to the existing TDD system is used;

wherein, the M is max{MTDD, MFDD}, MFDD is a number of downlink subframes within a binding window determined by the FDD serving cell according to the timing relationship, and when MFDD=1, MTDD is a number of downlink subframes within a binding window determined by the TDD serving cell according to the timing relationship; when the HARQ-ACK corresponds only the PDSCH of the FDD serving cell, MTDD=0.

2. The method according to claim 1, wherein,
when the HARQ-ACK corresponds to the PDSCH of one serving cell, the UE sends the HARQ-ACK in the determined uplink subframes using a PUCCH format 1a/1b.

3. The method according to claim 2, wherein,
when the HARQ-ACK corresponds to the PDSCH of one serving cell and the serving cell is not the primary serving cell, resources used when the UE sends with the PUCCH format 1a/1b are obtained by the following manners:

when the PDSCH of the serving cell corresponding to the HARQ-ACK is scheduled through cross-carrier by the primary serving cell, the PUCCH resources used when sending with the PUCCH format 1a/1b are obtained in an implicit mapping manner; and when the PDSCH of the serving cell corresponding to the HARQ-ACK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and transmission power control (TPC) corresponding to downlink control information (CCI) indicates the resources specifically used; or a set of resources is configured by a high layer, and acknowledgement/non-acknowledgement (ACK/NACK) resource offset (ARO) corresponding to Enhanced Physical Downlink Control Channel (E-PDCCH) indicates the resources specifically used.

4. The method according to claim 1, wherein,
when the UE sends the HARQ-ACK on the PUCCH corresponding to the determined uplink subframes and the configured sending manner is PUCCH format 3:

when the HARQ-ACK corresponds to the PDSCH of one serving cell, the UE sends the HARQ-ACK using the PUCCH format 1a/1b; and when the HARQ-ACK corresponds to the PDSCH of a plurality of serving cells, the UE sends the HARQ-ACK using the PUCCH format 3 of the existing TDD system.

5. The method according to claim 4, wherein,
when the HARQ-ACK corresponds to the PDSCH of one serving cell and the serving cell is not the primary serving cell, resources used when the UE sends with the PUCCH format 1a/1b are obtained by the following manners:

when the PDSCH of the serving cell corresponding to the HARQ-ACK is scheduled through cross-carrier by the primary serving cell, the PUCCH resources used when sending with the PUCCH format 1a/1b are obtained in an implicit mapping manner; and when the PDSCH of the serving cell corresponding to the HARQ-ACK is not scheduled through cross-carrier by the primary serving cell, the PUCCH resources used when sending with the PUCCH format 1a/1b are obtained in any one of the following manners:
configuring through high layer signaling; or
a set of resources is configured by a high layer, and transmission power control (TPC) corresponding to downlink control information (CCI) indicates the resources specifically used; or
a set of resources is configured by a high layer, and acknowledgement/non-acknowledgement (ACK/NACK) resource offset (ARO) corresponding to Enhanced Physical Downlink Control Channel (E-PDCCH) indicates the resources specifically used.

6. A User equipment (UE), comprising a memory containing instructions and a processor, which executes the instructions in the memory to:
determine uplink subframes in which uplink control information is transmitted to be uplink subframes of a Frequency Division Duplex (FDD) serving cell and/or uplink subframes of a Time Division Duplex (TDD) serving cell according to a predefined rule when the FDD serving cell and the TDD serving cell are aggregated; and
send the uplink control information in the determined uplink subframes in which the uplink control information is transmitted;
wherein the predefined rule includes one or more of the following rules:
a primary serving cell is the TDD serving cell, subframes N have both the uplink subframes of the FDD serving cell and the uplink subframes of the TDD serving cell, and when there is uplink control information to be sent in the subframes N, the UE sends the uplink control information in the uplink subframes of the TDD serving cell;
a primary serving cell is the TDD serving cell, subframes N have only the uplink subframes of the FDD serving cell, and when there is uplink control information to be sent in the subframes N, the UE sends the uplink control information in the uplink subframes of the FDD serving cell;
when a primary serving cell is the FDD serving cell, the UE sends the uplink control information in the uplink subframes of the FDD serving cell;
signaling indicates that the uplink control information is sent in the uplink subframes of the FDD serving cell or the uplink subframes of the TDD serving cell; and
the uplink control information is transmitted in the uplink subframes of the primary serving cell;
transmit the uplink control information on Physical Uplink Control Channel (PUCCH) or Physical uplink Shared Channel (PUSCH) corresponding to the determined uplink subframes in which the uplink control information is transmitted;
wherein the uplink control information includes one or more of channel state information (CSI), scheduling request (SR) and Hybrid automatic repeat request acknowledgement (HARQ-ACK);
when the uplink control information includes the HARQ-ACK,
make the FDD serving cell determine the HARQ-ACK which needs to be sent on the PUCCH or PUSCH corresponding to the determined uplink subframes according to a Physical downlink Shared Channel (PDSCH) and HARQ-ACK timing relationship corresponding to the FDD serving cell, and make the TDD serving cell determine the HARQ-ACK which needs to be sent on the PUCCH or PUSCH corresponding to the determined uplink subframes according to a PDSCH and HARQ timing relationship corresponding to the TDD serving cell; or
make the FDD serving cell determine the HARQ-ACK which needs to be sent on the PUCCH or PUSCH corresponding to the determined uplink subframes according to the PDSCH and HARQ-ACK timing relationship corresponding to the FDD serving cell, and make the TDD serving cell determine the HARQ-ACK which needs to be sent on the PUCCH or PUSCH corresponding to the determined uplink subframes according to the HARQ-ACK timing relationship corresponding to the FDD serving cell; or
make both the FDD serving cell and the TDD serving cell determine the HARQ-ACK which needs to be sent on the PUCCH or PUSCH corresponding to the determined uplink subframes according to the PDSCH and HARQ-ACK timing relationship corresponding to the FDD serving cell when the FDD serving cell is the primary serving cell; and make the FDD serving cell and the TDD serving cell respectively determine the HARQ-ACK which needs to be sent on the PUCCH or PUSCH corresponding to the determined uplink subframes according to the PDSCH and HARQ-ACK timing relationship corresponding to the respective serving cell when the TDD serving cell is the primary serving cell;
select a mapping table used by the PUCCH format 1b with channel selection according to any one of the following rules when the HARQ-ACK is sent on the PUCCH corresponding to the determined uplink subframes and a configured sending manner is PUCCH format 1b with channel selection:
a mapping table corresponding to the TDD system is used;
a corresponding mapping table is selected according to M, when M>=2, a mapping table corresponding to the existing TDD system is used, and when M=1, a mapping table corresponding to the existing FDD system is used; and
a corresponding mapping table is selected according to the value of M and the primary serving cell, when M>=2, the mapping table corresponding to the existing TDD system is used, and when M=1, in a case that the FDD serving cell is the primary cell, the mapping table corresponding to the existing FDD system is used, and in a case that the TDD serving cell is the primary cell, the mapping table corresponding to the existing TDD system is used;
wherein,
the M is max{MTDD,MFDD}, MFDD is a number of downlink subframes within a binding window determined by the FDD serving cell according to the timing relationship, and when MFDD=1, MTDD is a number of downlink subframes within a binding window determined by the TDD serving cell according to the timing relationship; when the HARQ-ACK corresponds only the PDSCH of the FDD serving cell, MTDD=0.

7. The user equipment according to claim 6, wherein, the processor is configured to:
send the HARQ-ACK in the determined uplink subframes using a PUCCH format 1a/1b when the HARQ-ACK corresponds to the PDSCH of one serving cell.

8. The user equipment according to claim 7, wherein, the processor is configured to:

when the HARQ-ACK corresponds to the PDSCH of one serving cell and the serving cell is not the primary serving cell, obtain resources used when sending with the PUCCH format 1a/1b by the following manners:

when the PDSCH of the serving cell corresponding to the HARQ-ACK is scheduled through cross-carrier by the primary serving cell, the PUCCH resources used when sending with the PUCCH format 1a/1b are obtained in an implicit mapping manner; and when the PDSCH of the serving cell corresponding to the HARQ-ACK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and transmission power control (TPC) corresponding to downlink control information (CCI) indicates the resources specifically used; or a set of resources is configured by a high layer, and acknowledgement/non-acknowledgement (ACK/NACK) resource offset (ARO) corresponding to Enhanced Physical Downlink Control Channel (E-PDCCH) indicates the resources specifically used.

9. The user equipment according to claim 6, wherein, the processor is configured to:

when the HARQ-ACK is sent on the PUCCH corresponding to the determined uplink subframes and the configured sending manner is PUCCH format 3, send the HARQ-ACK using the PUCCH format 1a/1b when the HARQ-ACK corresponds to the PDSCH of one serving cell; and send the HARQ-ACK using the PUCCH format 3 of the existing TDD system when the HARQ-ACK corresponds to the PDSCH of a plurality of serving cells.

10. The user equipment according to claim 9, wherein, the processor is configured to:

when the HARQ-ACK corresponds to the PDSCH of one serving cell and the serving cell is not the primary serving cell, obtain resources used when sending with the PUCCH format 1a/1b by the following manners:

when the PDSCH of the serving cell corresponding to the HARQ-ACK is scheduled through cross-carrier by the primary serving cell, the PUCCH resources used when sending with the PUCCH format 1a/1b are obtained in an implicit mapping manner; and when the PDSCH of the serving cell corresponding to the HARQ-ACK is not scheduled through cross-carrier by the primary serving cell, the PUCCH resources used when sending with the PUCCH format 1a/1b are obtained in any one of the following manners:

configuring through high layer signaling; or a set of resources is configured by a high layer, and transmission power control (TPC) corresponding to downlink control information (CCI) indicates the resources specifically used; or a set of resources is configured by a high layer, and acknowledgement/non-acknowledgement (ACK/NACK) resource offset (ARO) corresponding to Enhanced Physical Downlink Control Channel (E-PDCCH) indicates the resources specifically used.

* * * * *